(12) United States Patent
Yamashita et al.

(10) Patent No.: US 8,870,653 B2
(45) Date of Patent: Oct. 28, 2014

(54) OPERATING DEVICE AND INFORMATION PROCESSING SYSTEM

(75) Inventors: Toru Yamashita, Kyoto (JP); Yasuyuki Shimohata, Kyoto (JP); Kazuhiro Hosoi, Kyoto (JP); Ryoji Kuroda, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 572 days.

(21) Appl. No.: 12/821,773

(22) Filed: Jun. 23, 2010

(65) Prior Publication Data

US 2011/0263328 A1 Oct. 27, 2011

(30) Foreign Application Priority Data

Apr. 22, 2010 (JP) .................................. 2010-098574

(51) Int. Cl.
*A63F 9/00* (2006.01)
*A63F 13/98* (2014.01)
*A63F 13/20* (2014.01)

(52) U.S. Cl.
CPC .................. *A63F 13/02* (2013.01); *A63F 13/06* (2013.01); *A63F 2300/1043* (2013.01)
USPC .......................................................... 463/36

(58) Field of Classification Search
USPC .......................................................... 463/37
See application file for complete search history.

(56) References Cited

U.S. PATENT DOCUMENTS

| | | | | |
|---|---|---|---|---|
| 4,107,642 A | * | 8/1978 | Crummett | 338/128 |
| 4,748,441 A | * | 5/1988 | Brzezinski | 345/161 |
| 5,976,018 A | * | 11/1999 | Druckman | 463/47 |
| 6,130,664 A | | 10/2000 | Suzuki | |
| D441,368 S | * | 5/2001 | Alviar et al. | D14/412 |
| D449,614 S | * | 10/2001 | Osborn et al. | D14/412 |
| 6,654,004 B2 | * | 11/2003 | Hoggarth | 345/161 |
| 6,811,491 B1 | * | 11/2004 | Levenberg et al. | 463/47 |
| 7,094,147 B2 | * | 8/2006 | Nakata et al. | 463/9 |
| 7,176,892 B2 | * | 2/2007 | Kobayashi | 345/161 |
| 7,407,439 B1 | * | 8/2008 | Ochoa | 463/37 |
| 7,927,216 B2 | * | 4/2011 | Ikeda et al. | 463/38 |
| 7,931,535 B2 | * | 4/2011 | Ikeda et al. | 463/38 |
| 8,416,190 B2 | | 4/2013 | Hirata et al. | |

(Continued)

FOREIGN PATENT DOCUMENTS

| | | |
|---|---|---|
| JP | 10-240433 | 9/1998 |
| JP | 2007-54114 | 3/2007 |

(Continued)

OTHER PUBLICATIONS

Miller, Paul. "Playstation Move: everything you ever wanted to know". Mar. 11, 2010. <http://www.engadget.com/2010/03/11/playstation-move-everything-you-ever-wanted-to-know/>.*

(Continued)

*Primary Examiner* — Seng H Lim

(74) *Attorney, Agent, or Firm* — Nixon & Vanderhye, P.C.

(57) ABSTRACT

An operating device has a narrow housing, and in this housing, an acceleration sensor and/or a gyro sensor are accommodated. Operation data inclusive of acceleration data and/or angular velocity data acquired from the acceleration sensor and/or the gyro sensor is transmitted by an operation data transmitter. Then, at a lower end of the housing, an elastic member having a spherical surface or substantially a spherical surface is provided.

21 Claims, 19 Drawing Sheets

(56) References Cited

U.S. PATENT DOCUMENTS

| | | | |
|---|---|---|---|
| 2004/0180720 A1* | 9/2004 | Nashi et al. | 463/37 |
| 2005/0208999 A1* | 9/2005 | Cheng et al. | 463/37 |
| 2006/0154726 A1* | 7/2006 | Weston et al. | 463/37 |
| 2007/0052177 A1* | 3/2007 | Ikeda et al. | 273/317 |
| 2007/0066394 A1* | 3/2007 | Ikeda et al. | 463/37 |
| 2008/0015017 A1* | 1/2008 | Ashida et al. | 463/37 |
| 2009/0298590 A1* | 12/2009 | Marks et al. | 463/37 |
| 2010/0105475 A1* | 4/2010 | Mikhailov et al. | 463/33 |
| 2010/0105480 A1* | 4/2010 | Mikhailov et al. | 463/38 |
| 2010/0178981 A1* | 7/2010 | Holcomb et al. | 463/37 |
| 2010/0279771 A1* | 11/2010 | Block et al. | 463/37 |
| 2010/0304868 A1* | 12/2010 | Zalewski | 463/38 |
| 2011/0263329 A1* | 10/2011 | Miyazaki et al. | 463/36 |

FOREIGN PATENT DOCUMENTS

| | | |
|---|---|---|
| JP | 2007-83024 | 4/2007 |
| JP | 2009-140107 | 6/2009 |
| JP | 2009-276879 | 11/2009 |
| WO | 2008/102432 A1 | 8/2008 |

OTHER PUBLICATIONS

"Wii remote controller" of Nintendo Co., Ltd., URL:http//www.nintendo.co.jp/wii/controllers/index.html, 4 pages, retrieved on Jun. 16, 2014.

* cited by examiner

FIG. 2
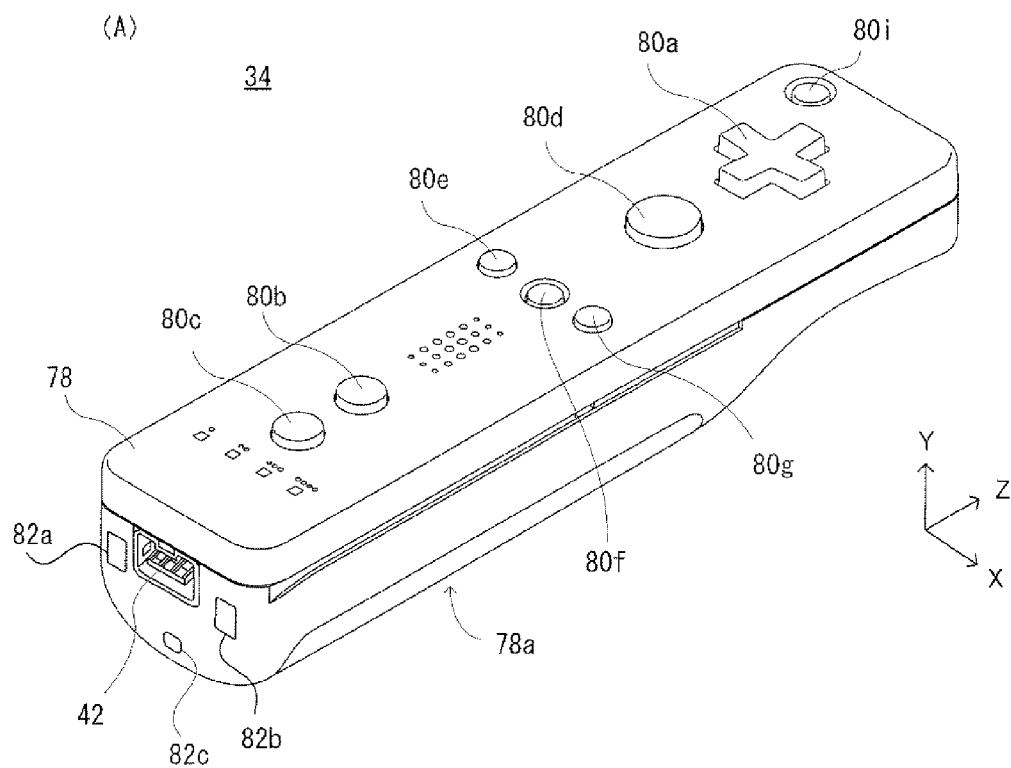
(A)
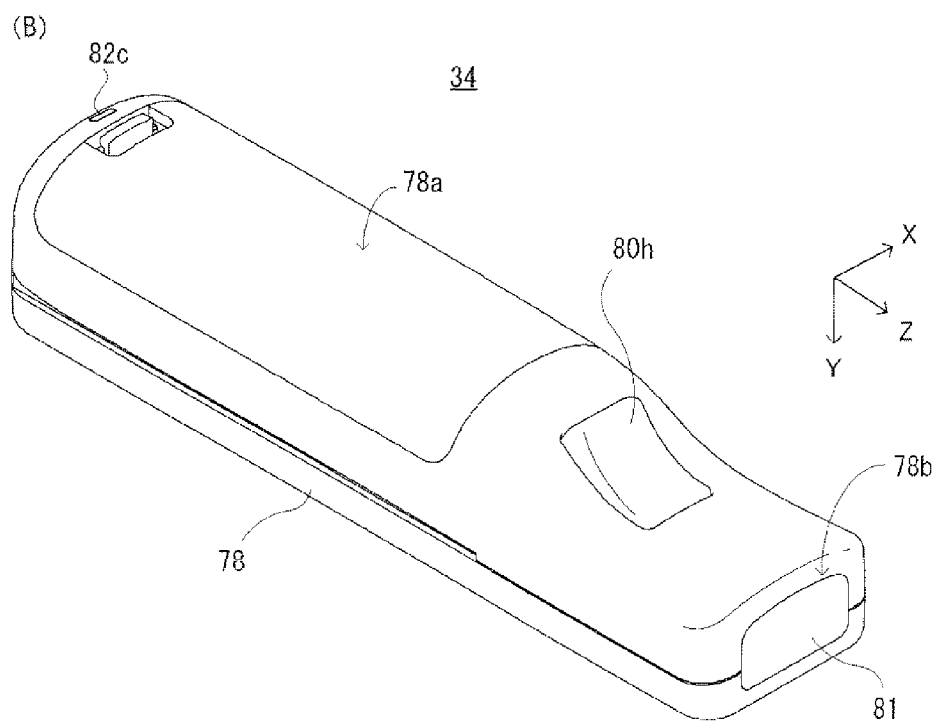
(B)

FIG. 3
(A)
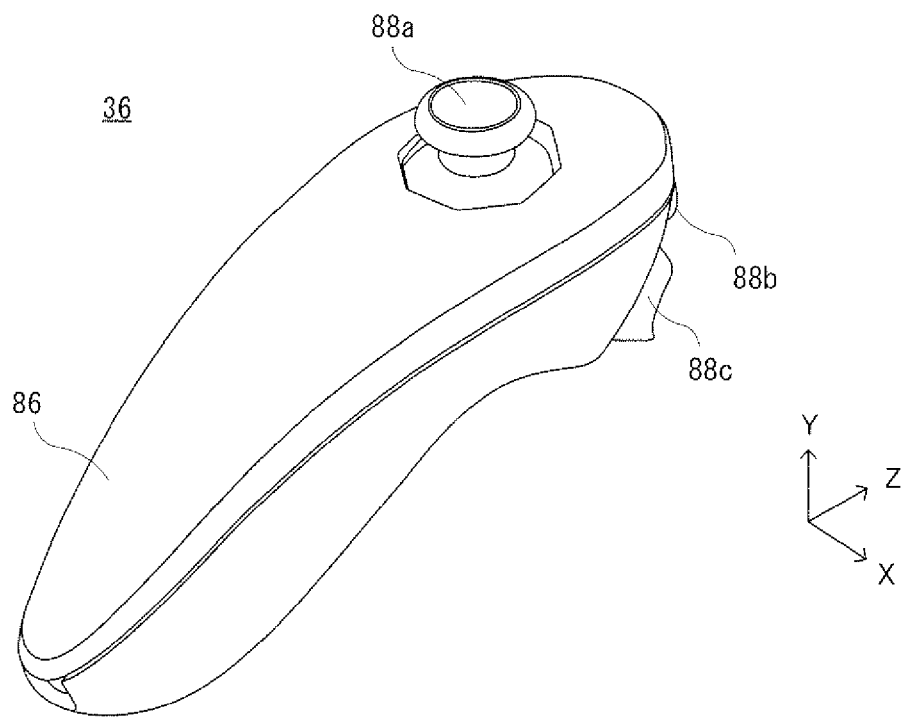
(B)
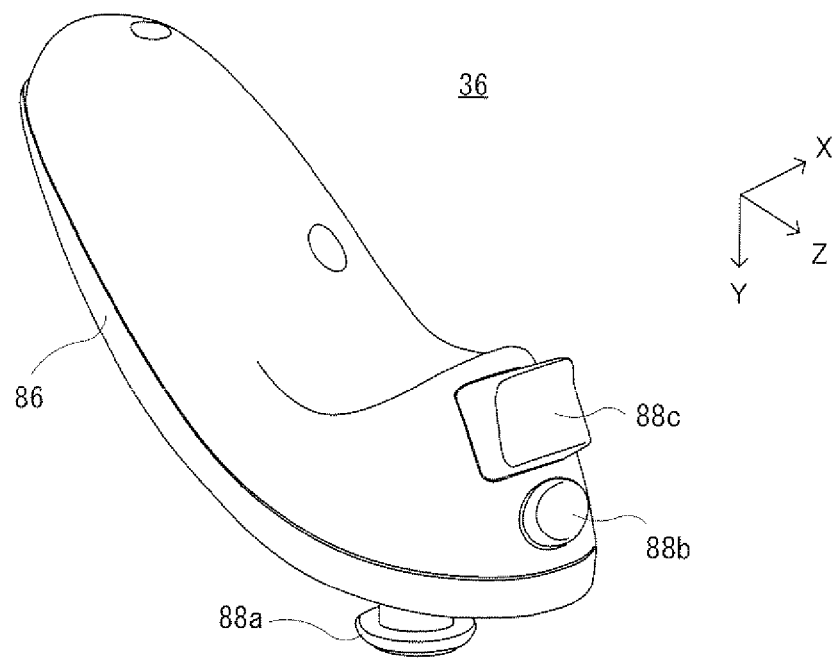

FIG. 6
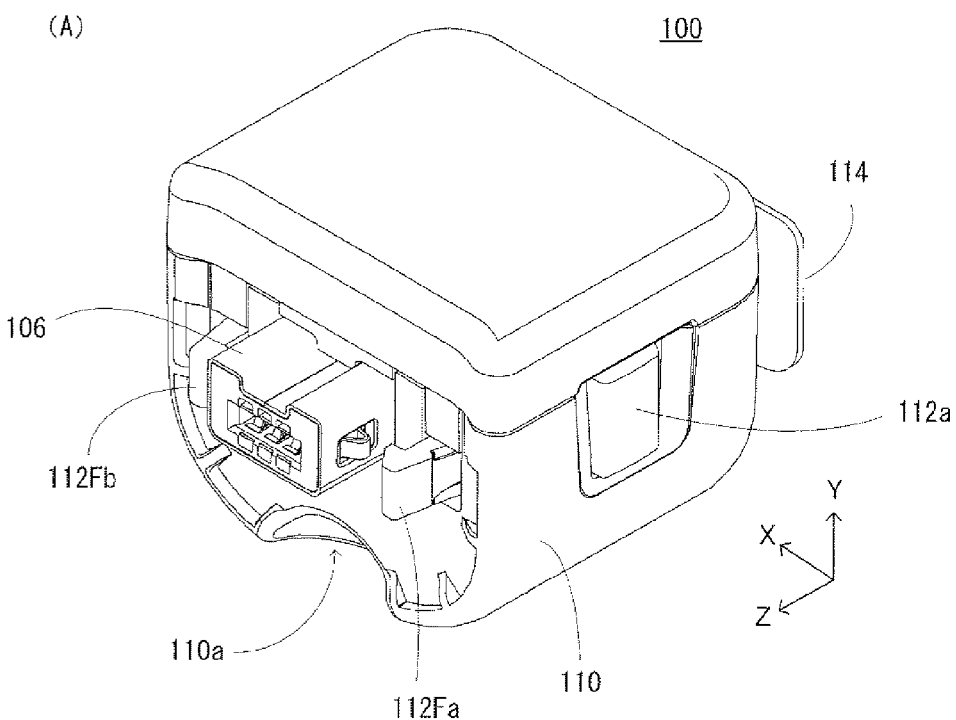
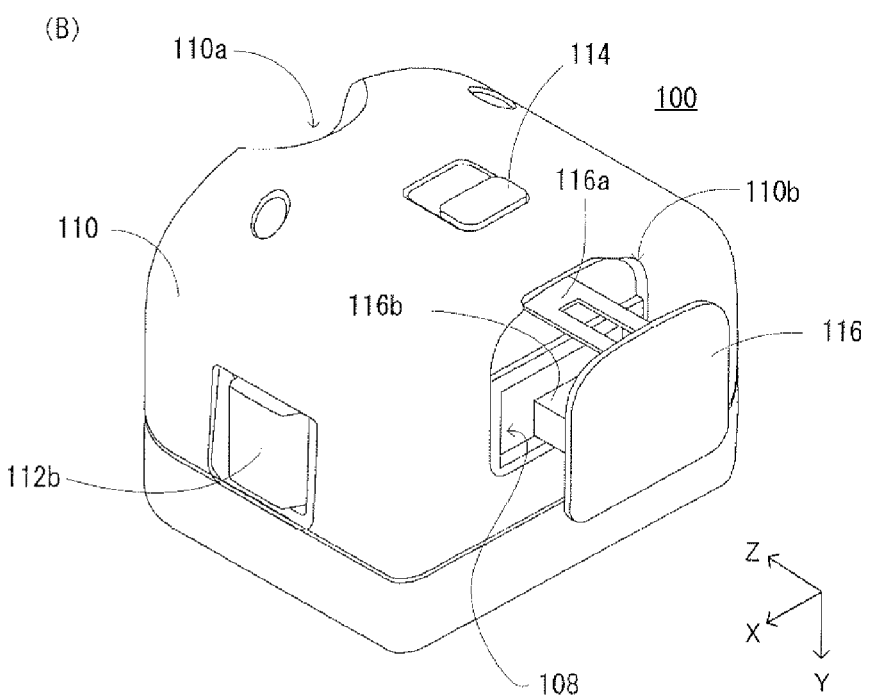

Sf : Sf0
(SUBSTANTIALLY SPHERICAL SURFACE)

FIG. 17
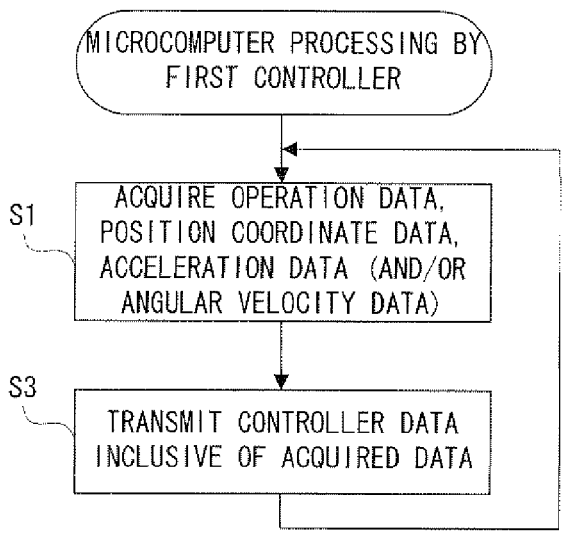
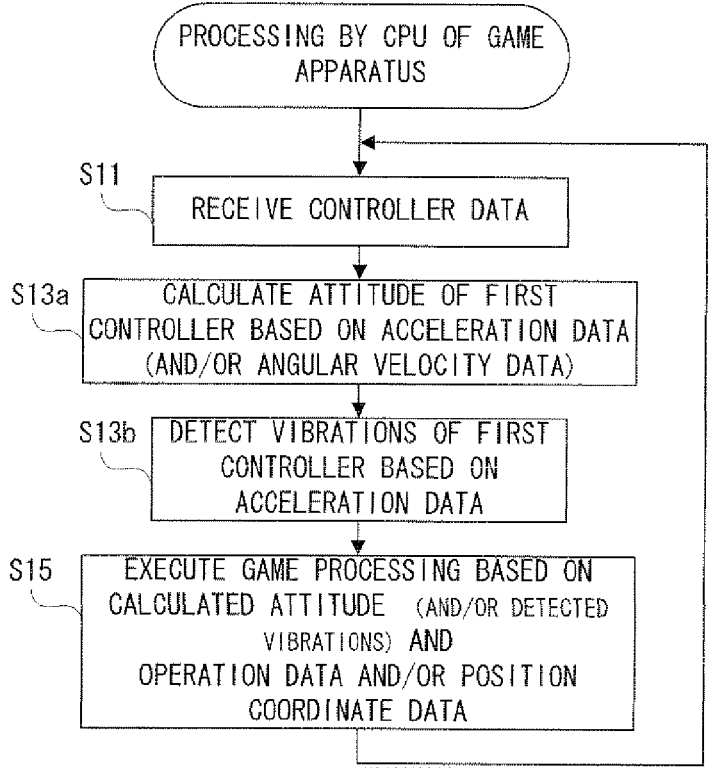

FIG. 18
(A)
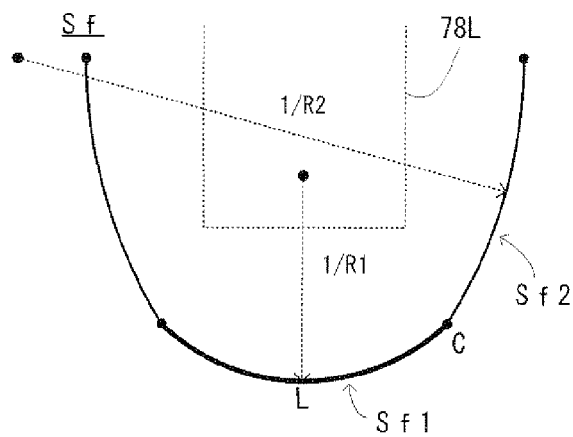
(B)
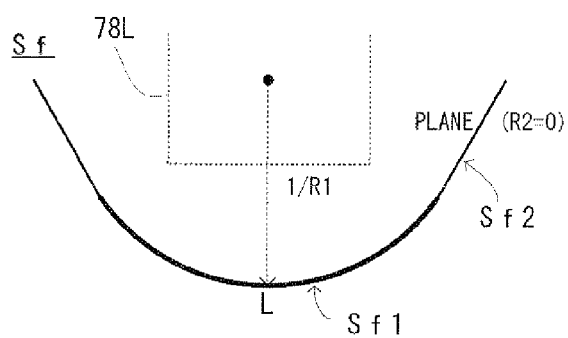
(C)
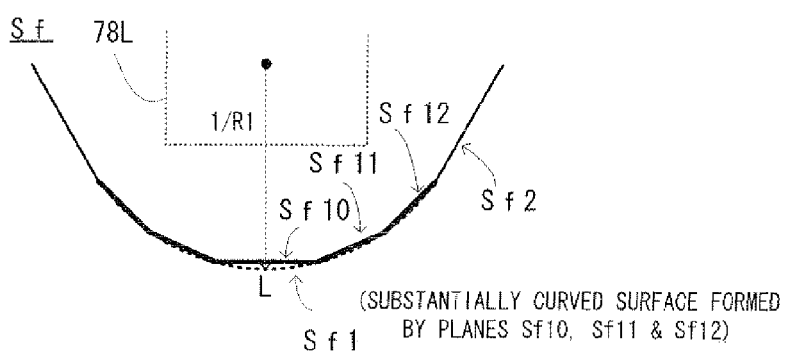

FIG. 20
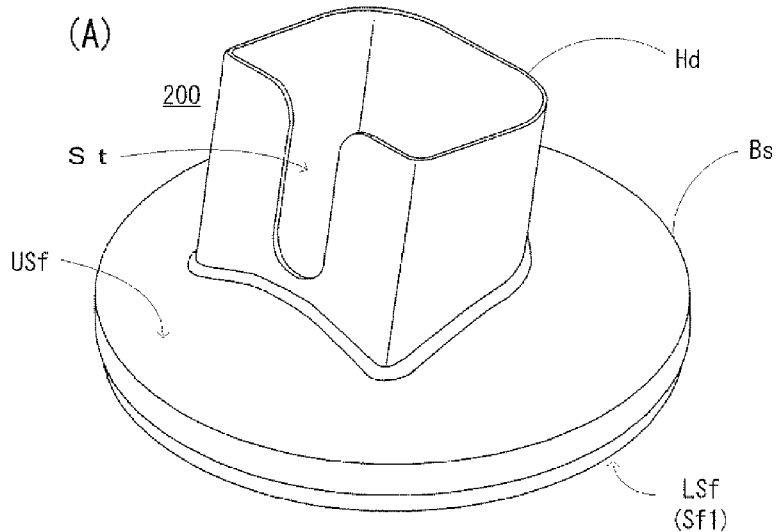
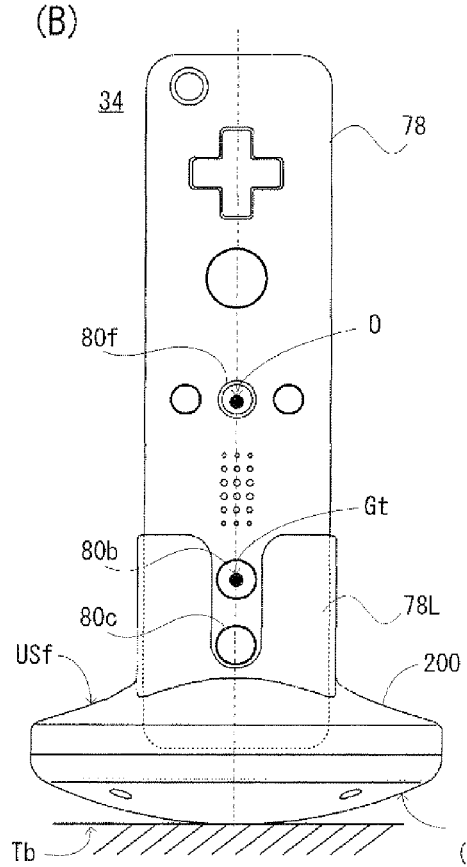
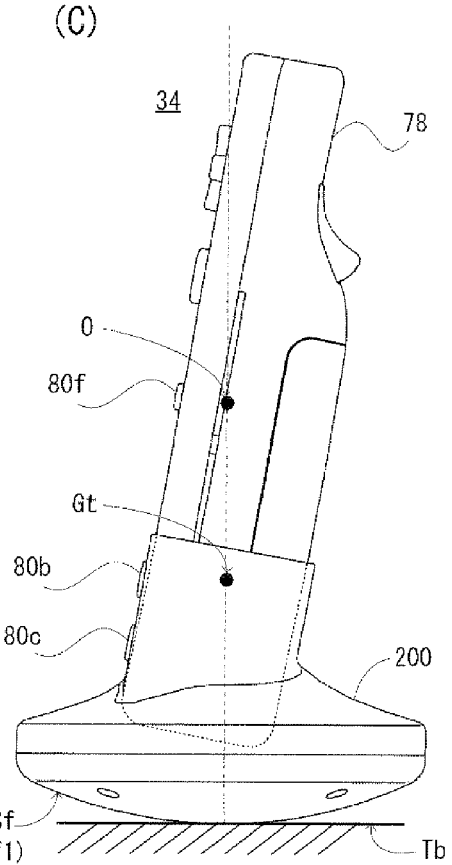

OPERATING DEVICE AND INFORMATION PROCESSING SYSTEM

CROSS REFERENCE OF RELATED APPLICATION

The disclosure of Japanese Patent Application No. 2010-98574 is incorporated herein by reference.

BACKGROUND OF THE INVENTION

1. Field of the invention

The present invention relates to an operating device and an operation system. More specifically, the present invention relates to an operating device including an acceleration sensor and/or a gyro sensor and an information processing system including such an operating device.

2. Description of the related art

As one example of a system of such a kind, "Wii remote controller" (Wii: registered trademark) including an acceleration sensor is disclosed on Web page "Wiil controller" of Nintendo Co., Ltd. URL:http://www.nintendo.co.jp/wii/controllers/index.html, for example. The "Wii remote controller" can be connected with a "Wii motion plus" including a gyro sensor. When a user swings and tilts the "Wii remote controller", operation data including acceleration data and/or angular velocity data is transmitted from the "Wii remote controller". In a Wii console, game processing based on the operation data received from the "Wii remote controller" is executed. The acceleration data and/or the angular velocity data are used for controlling the attitude and the motion of an object, for example.

Furthermore, detailed configurations and operations of the apparatus and the system of this kind is disclosed in Japanese Patent Application Laid-Open No. 2007-83024 and Japanese Patent Application Laid-Open No. 2007-54114, for example.

By the way, in a game which requires precise controls of attitudes and motions, such as a flight simulator and a first-person shooting game, for example, a joystick is often used as an operating device. By making an operation regarding the "Wii remote controller" as a joystick, this kind of games can be performed, but a fulcrum when the "Wii remote controller" is tilted is not fixed to thereby cause variations among individuals and make it difficult to a precise control. Hereupon, processing of bringing one end of the "Wii remote controller" in contact with the surface of the table, or the like, and tilting the "Wii remote controller" by regarding the contacted point as a fulcrum are conceivable.

However, the "Wii remote controller" is not suitable for an operation of being contacted and tilted because the housing thereof is hard and flat.

SUMMARY OF THE INVENTION

Therefore, it is a primary object of the present invention to provide a novel operating device and a novel information processing system.

Another object of the present invention is to provide an operating device and an information processing system which are suitable for an operation of being contacted and tilted.

The present invention adopts the following feature in order to solve the aforementioned problem.

A first invention is an operating device comprising a narrow housing; an acceleration sensor and/or a gyro sensor accommodated in or coupled to the housing; an operation data transmitter which transmits operation data inclusive of at least acceleration data and/or angular velocity data respectively acquired from the acceleration sensor and/or the gyro sensor; and an elastic member which is provided at one end or in proximity to the one end of the housing, wherein the elastic member has a spherical surface or substantially a spherical surface.

In the first invention, an operating device has a narrow housing, and an acceleration sensor and/or a gyro sensor is accommodated in or coupled to the housing. Operation data inclusive of acceleration data and/or angular velocity data respectively acquired from the acceleration sensor and/or the gyro sensor is transmitted by an operation data transmitter. Then, an elastic member having a spherical surface or substantially a spherical surface is provided at one end or in proximity to the one end of the housing.

Here, the acceleration sensor and/or the gyro sensor is typically integrated in the housing, but it may be externally attached. In a case that an external unit including the gyro sensor is attached to a rear end of the housing, the elastic member is attached to a rear end of the external unit. Furthermore, in a case that the housing is enclosed in a jacket, the elastic member is attached to the rear end of the housing via the jacket. The elastic member may be integrated with the external unit and the jacket.

Furthermore, substantially the spherical surface may be a generally spherical surface, and a part of it may include a plane and irregularities.

According to the first invention, the player can operate the operating device like a joystick by holding the housing with elastic member, bringing the spherical surface or substantially the spherical surface of the elastic member in to contact with surface of the table, etc., and tilting the housing by regarding the contact point or the contact surface as a fulcrum. Furthermore, the player can perform an operation of holding the housing with elastic member, and pressing the spherical surface or substantially the spherical surface of the elastic member against the surface of the table while bringing it into contact with the surface of the table (pushing operation), and an operation of beating the surface of the table with the spherical surface or substantially the spherical surface of the elastic member (beating operation).

A second invention is an operating device comprising: a narrow housing; an acceleration sensor and/or a gyro sensor which are accommodated in or coupled to the housing; an operation data transmitter which transmits operation data inclusive of at least acceleration data and/or angular velocity data respectively acquired from the acceleration sensor and/or the gyro sensor; and an elastic member which is provided at one end or in proximity to the one end of the housing, wherein the elastic member has a curved surface on a side being opposite to a side attached to the housing, and brings a center of gravity of the operating device entire including the elastic member between a center of curvature of the curved surface and the curved surface by being attached to the housing.

In the second invention, the operating device has a narrow housing, and an acceleration sensor and/or a gyro sensor are accommodated in or coupled to the housing. Operation data inclusive of the acceleration data and/or the angular velocity data respectively acquired from the acceleration sensor and/or the gyro sensor is transmitted by the operation data transmitter. Then, an elastic member is provided at one end or in proximity to the one end of the housing. The elastic member has a curved surface on a side being opposite to a side attached to the housing, and brings a center of gravity of the operating device entire including the elastic member between a center of curvature of the curved surface and the curved surface by being attached to the housing.

The curved surface here may be one having a constant curvature (spherical surface), or having a curvature which changes stepwise or continuously. The curved surface may be a generally curved surface, may include a plane and irregularities, and may be substantially a curved surface being made up of a plurality of planes.

For bringing a center of gravity between the center of curvature of the curved surface and the curved surface, there are methods of bringing the center of gravity close to the curved surface by weighting the elastic member, especially, the vicinity of the curved surface and/or bringing the center of curvature far away from the curved surface by making the curvature of the curved surface small. In the former method, if the anchor is arranged in proximity to the curved surface, the position of the center of gravity can be adjusted by the weight of the anchor, which is more preferable.

According to the second invention, the player can operate the operating device like a joystick by holding the housing with elastic member, bringing the spherical surface or substantially the spherical surface of the elastic member in to contact with the surface of the table, etc., and tilting the housing regarding the contact point or the contact surface as a fulcrum. The player can perform an operation of holding the housing with elastic member, and pressing the spherical surface or substantially the spherical surface of the elastic member against the surface of the table while bringing it into contact with the surface of the table (pushing operation). In addition, the center of gravity of the elastic member is positioned in proximity to the curved surface, and therefore, resilience in correspondence with the tilt works on the housing to thereby make the operating device stand up by itself, and the user can have an operational feeling in correspondence with the tilt.

It should be noted that in the aforementioned first invention as well, by arranging the anchor in proximity to the lower end of the spherical surface or substantially the spherical surface (end being opposite to the housing) to thereby bring the center of gravity downward, the operating device can be stood up by itself, and the user can have operational feeling in correspondence with the tilt.

A third invention is an operating device according to the first or the second invention, and the elastic member is detachably attached to the one end of the housing.

According to the third invention, the elastic member can be detached as required, and therefore, it is possible to improve the convenience.

A fourth invention is an operating device according to the first or the second invention, further comprises: a camera provided to the housing at an end being opposite to the end attached with the elastic member, and a position information calculator which calculates position information of an object within an image imaged by the camera, wherein the operation data further includes the position information calculated by the position information calculator.

According to the fourth invention, the operation data inclusive of the position information in addition to the acceleration data and/or the angular velocity data is transmitted, and therefore, various operations can be performed through motions and positions (directions) of the operating device.

A fifth invention is an operating device according to the fourth invention, and further comprise a first button toward the camera on a top surface of the housing, wherein the operation data further includes operation information of the first button.

A sixth invention is an operating device according to the fifth invention, and further comprises a second button provided at a position being opposed to the first button on a bottom surface of the housing, wherein the operation data further includes operation information of the second button.

According to the fifth and the sixth inventions, the operation data inclusive of the position information and the button operation information in addition to the acceleration data and/or the angular velocity data is transmitted, and therefore, various operations can be performed through motions and positions (directions) and the buttons of the operating device.

A seventh invention is an information processing system including an operating device and an information processing apparatus according to any one of claims one to six, and the information processing apparatus comprises a receiver which receives operation data from the operating device, an attitude calculator which calculates an attitude of the operating device on the basis of the acceleration data and/or the angular velocity data included in the operation data received by the receiver, and an information processor which performs predetermined information processing in correspondence with the attitude calculated by the attitude calculator.

According to the seventh invention, by tilting the operating device like a joystick (joystick-like operation), it is possible to cause the information processing apparatus to perform the predetermined information processing which requires precise controls of attitudes and motions, such as a flight simulator, and a first-person shooting game.

An eighth invention is an information processing system including an operating device and an information processing apparatus according to any one of claims one to six, and the information processing apparatus comprises a receiver which receives operation data from the operating device, a vibration detector which detects vibrations of the operating device on the basis of the acceleration data and/or the angular velocity data included in the operation data received by the receiver, and an information processor which performs predetermined information processing in correspondence with the vibration detected by the vibration detector.

According to the eighth invention, the operating device is vibrated by pressing the operating device against the surface of the table (pushing operation) and beating the surface of the table, etc. with the operating device (beating operation) to thereby cause the information processing apparatus to perform the predetermined information processing. For example, in the first-person shooting game, it is possible to fire a gun regarding the pushing operation as a trigger.

A ninth invention is an information processing system according to the eighth invention, and the information processing apparatus further comprises an attitude calculator which calculates an attitude of the operating device on the basis of the acceleration data and/or the angular velocity data included in the operation data received by the receiver, and the information processor performs the predetermined information processing in correspondence with the vibrations detected by the vibration detector and the attitude calculated by the attitude calculator.

According to the ninth invention, the joystick-like operation is combined with the pushing operation and the beating operation to thereby perform various information processing. For example, in the first-person shooting game, processing such as taking an aim at a target by the joystick-like operation, and firing a gun with the pushing operation can be performed.

A tenth invention is an elastic member provided at one end or in proximity to the one end of an operating device having a narrow housing, an acceleration sensor and/or a gyro sensor accommodated in or coupled to the housing, an operation data transmitter which transmits operation data inclusive of at least acceleration data and/or angular velocity data respectively acquired from the acceleration sensor and/or the gyro sensor, the elastic member has a spherical surface or substantially a spherical surface, and is formed with an concave having a shape substantially the same as that of the one end of the housing on the spherical surface or substantially the spherical surface.

In the tenth invention as well, similar to the first invention, it is possible to operate the operating device like a joystick. Furthermore, it is possible to perform the pushing operation and the beating operation as well.

An eleventh invention is an elastic member provided at one end or in proximity to the one end of an operating device having a narrow housing, an acceleration sensor and/or a gyro sensor accommodated in or coupled to the housing, an operation data transmitter which transmits operation data inclusive of at least acceleration data and/or angular velocity data respectively acquired from the acceleration sensor and/or the gyro sensor, the elastic member has a curved surface on a side being opposite to a side attached to the housing, and brings a center of gravity of the operating device entire including the elastic member between a center of curvature of the curved surface and the curved surface by being attached to the housing.

In the eleventh invention as well, similar to the second invention, it is possible to operate the operating device like a joystick. Furthermore, it is possible to perform the pushing operation. In addition, the operating device can stand up by itself, and the user can have an operational feeling in accordance with the tilt.

According to the present invention, it is possible to implement the operating device, the information processing system and the elastic member which are suitable for an operation of being contacted and tilted. In addition, it is possible to implement the operating device, the information processing system and the elastic member which are suitable for an operation being pressed or beaten as well.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 2 is an illustrative view showing an appearance of a first controller applied to FIG. 1 embodiment, FIG. 2(A) is a perspective view of the first controller as viewed from above rear, and FIG. 2(B) is a perspective view of the first controller as viewed from below front;

FIG. 3 is an illustrative view showing an appearance of a second controller applied to FIG. 1 embodiment, FIG. 3(A) is a perspective view of the second controller as viewed from above rear, and FIG. 3(B) is a perspective view of the second controller as viewed from below front;

FIG. 6 is an illustrative view showing an appearance of a gyro sensor unit applied to FIG. 1 embodiment, FIG. 6(A) is a perspective view of the gyro sensor unit as viewed from above front, and FIG. 6(B) is a perspective view of the gyro sensor unit as viewed from rear back;

FIG. 17 is a flowchart showing processing to be executed in FIG. 1 embodiment, FIG. 17(A) shows a part of an operation by a microcomputer of the first controller, and FIG. 17(B) shows a part of an operation by a CPU of the game apparatus;

FIG. 18 is an illustrative view showing a configuration example of a surface of the elastic member, FIG. 18(A) shows a surface being made up of two curved surfaces different in curvature (in a case that the curvature of the bottom surface is large), FIG. 18(B) shows a surface being made up of planes and a curve, and FIG. 18(C) shows substantially a curved surface being made up of three planes as to the surface in FIG. 18(B);

FIG. 20 is an illustrative view in relation to another elastic member, FIG. 20(A) is a perspective view showing structure of the elastic member, FIG. 20(B) is a top view showing the first controller attached with the elastic member, and FIG. 20(C) is a side view showing the first controller attached with the elastic member;

DETAILED DESCRIPTION OF THE PREFERRED EMBODIMENTS

Figure 1:
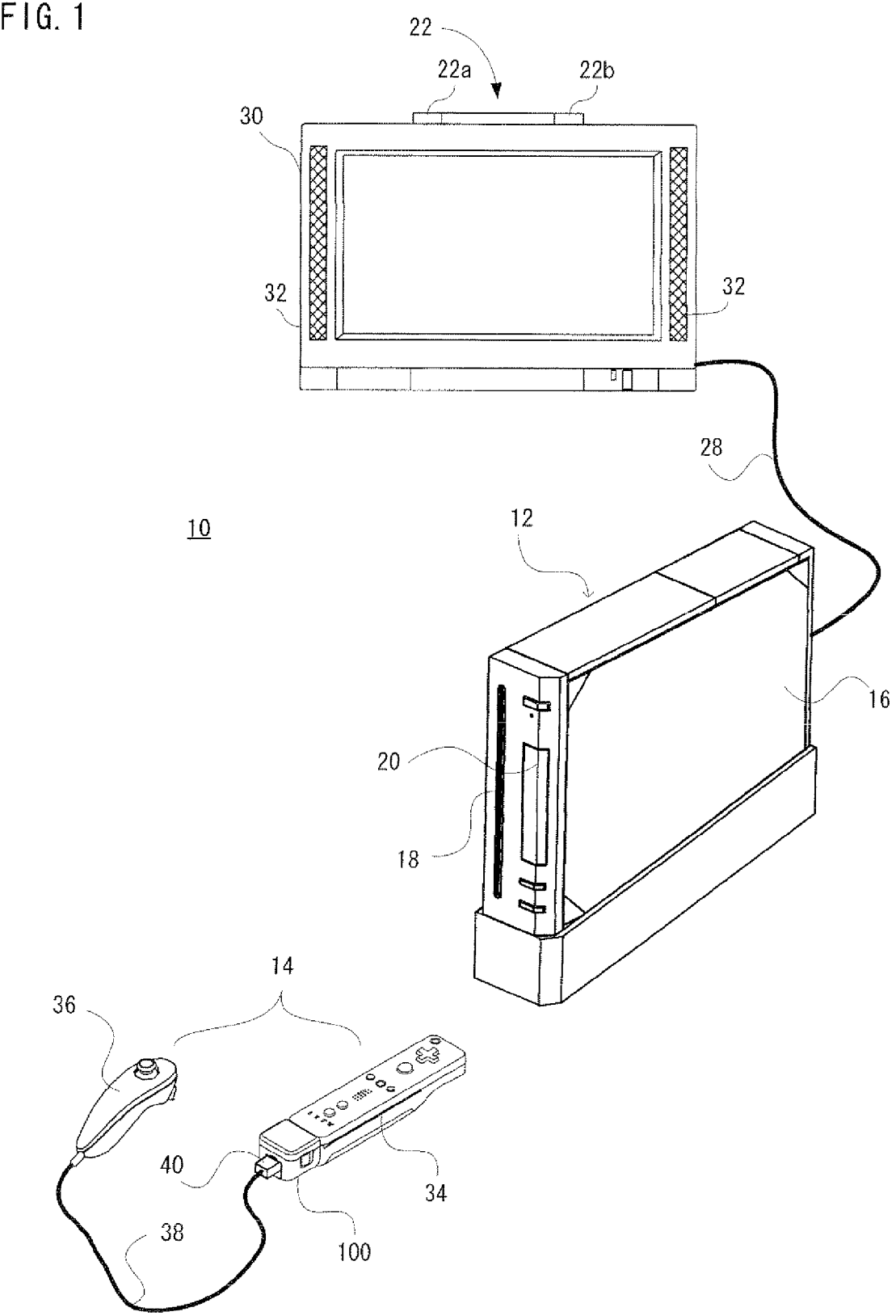
FIG. 1 is a block diagram showing a configuration of one embodiment of the present invention.

Referring to FIG. 1, a game system 10 of one embodiment of the present invention includes a game apparatus 12 and a controller 14. The game apparatus 12 is a game console. The controller 14 is an input device or an operating device by a user or a player. The game apparatus 12 and the controller 14 are connected wirelessly.

The game apparatus 12 includes a roughly rectangular parallelepiped housing 16, and the housing 16 is furnished with a disk slot 18 and a memory card slot cover 20 on a front surface. An optical disk 66 (FIG. 10) as one example of an information storage medium storing game program and data, etc. is inserted from the disk slot 18 to be loaded into a disk drive 54 (see FIG. 10) within the housing 16. Inside the external memory card slot cover 20 is provided with a connector for external memory card 62 (FIG. 10) through which a memory card (not shown) is inserted. The external memory card is employed for loading the game program, etc. read from the optical disk 66 to temporarily store it, storing (saving) game data (result data or proceeding data of the game) of the game played by means of the game system 10, and so forth. It should be noted that storing the game data described above may be performed on an internal memory such as a flash memory 64 (FIG. 10) in place of the external memory card.

The game apparatus 12 has an AV cable connector (not illustrated) on a rear surface of the housing 16, and by means of the connector, the game apparatus 12 is connected to a monitor (display) 30 via an AV cable 28. The monitor 30 is typically a color television receiver, and through the AV cable 28, a video signal from the game apparatus 12 is input to a video input terminal of the color television, and a sound signal is input to a sound input terminal thereof. Accordingly, a game image of a three-dimensional (3D) video game, for example, is displayed on the screen of the color television (monitor) 30, and a stereo game sound, such as a game music, a sound effect is output from integrated speakers 32.

Additionally, around the monitor 30 (upper side of the monitor 30 in this embodiment), a marker unit 22 having two infrared ray LEDs (markers) 22a and 22b is provided. Each of the markers 22a and 22b outputs infrared rays ahead of the monitor 30.

Furthermore, the power of the game apparatus 12 is applied by means of a general AC adapter (not illustrated). The AC adapter is connected to a standard wall outlet for home use, and transforms the house current to a low DC voltage signal suitable for driving the game apparatus 12. In another embodiment, a battery may be utilized as a power supply. Here, the marker unit 22 is connected with the game apparatus 12 through a power-supply wire not shown, and is supplied with power from the game apparatus 12.

The controller 14, which is described in detail later, includes a first controller 34 and a second controller 36 each capable of being held with one hand and a gyro sensor unit 100 attached to the first controller 34. On a rear end surface of the first controller 34, a connector 42 (FIG. 2(A), FIG. 11) is provided, and at an end of a cable 38 extending from the rear end of the second controller 36, a connector 40 (FIG. 4(A), FIG. 11) is provided, and on a front end surface and a rear end surface of the gyro sensor unit 100, connectors 106 and 108 (FIG. 6(A), FIG. 6(B), FIG. 7 and FIG. 11) are respectively provided. The connector 106 at the front end surface of the gyro sensor unit 100 is connectable to the connector 42 of the first controller 34, and the connector 40 of the second controller 36 is connectable to the connector 42 of the first controller 34 or the connector 108 at the rear end surface of the gyro sensor unit 100.

By connecting the connector 106 to the connector 42, the gyro sensor unit 100 is physically and electrically connected to the first controller 34. From the gyro sensor unit 100 thus attached (connected as a single unit) to the first controller 34, angular velocity data indicating an angular velocity of the first controller 34 is output.

In a case that the gyro sensor unit 100 is thus attached to the first controller 34, the connector 40 of the second controller 36 is connected to the connector 108 at the rear end surface of the gyro sensor unit 100. That is, the connector 42 has a structure selectively connectable to either of the connector 106 or the connector 40, and the connector 40 has a structure of selectively connectable to either of the connector 42 or the connector 108. Accordingly, the connector 106 and the connector 108 provided to the gyro sensor unit 100 cannot actually be connected because of being a part of the same housing, but have shapes connectable with each other. Input data from the second controller 36 is applied to the first controller 34 via the cable 38 and the gyro sensor unit 100. The first controller 34 transmits controller data including input data from the first controller 34 itself, angular velocity data from the gyro sensor unit 100, and input data from the second controller 36 to the game apparatus 12.

Alternatively, in a case that the connector 40 is connected to the connector 42, operation data or input data from the second controller 36 are applied to the first controller 34 via the cable 38, and the first controller 34 transmits controller data including the input data from the first controller 34 itself and the input data from the second controller 36 to the game apparatus 12.

In the system here for transmitting the input data from the first controller 34 and the input data from the second controller 36, a data amount to be transmitted at a time may sometimes be designed so as not be added, but in a case that the gyro unit 100 is added, angular velocity data from the gyro unit 100 and input data from the second controller 36 are alternately output to the first controller 36, which allows both of the data to be transmitted. The data control can be performed by the gyro unit 100, so that the first controller 34 and the second controller 36 are not required to be changed in design.

Thus, the gyro sensor unit 100 is an expanding unit for adding a gyro function to the first controller 34 by utilizing the existing first controller 34 and second controller 36 as it is.

In the game system 10, a user first turns the power of the game apparatus 12 on for playing the game (or another application), then selects an appropriate optical disk 66 storing a video game (or another application the player wants to play), and loads the optical disk 66 into the disk drive 54 through the disk slot 18 of the game apparatus 12. In response thereto, the game apparatus 12 starts to execute a video game or another application on the basis of the software stored in the optical disk 66. The user operates the controller 14 in order to apply an input to the game apparatus 12.

FIG. 2 shows one example of an appearance of the first controller 34. FIG. 2(A) is a perspective view of the first controller 34 as seeing it from above rear, and FIG. 2(B) is a perspective view of the first controller 34 as seeing it from below front.

The first controller 34 has a housing 78 fanned by plastic molding, for example. The housing 78 is formed into an approximately rectangular parallelepiped shape regarding a back and forth direction (Z-axis direction shown) as a longitudinal direction, and has a size small enough to be held by one hand of a child and an adult. As one example, the housing 78 has a length or a width approximately the same as that of a palm of a person. The player can perform a game operation by means of the first controller 34, that is, by pushing the buttons provided on it and by changing a position and a direction of the first controller 34 itself.

The housing 78 is provided with a plurality of operation buttons. That is, on the top surface of the housing 78, a cross key 80a, an X button 80b, a Y button 80c, an A button 80d, a select switch 80e, a menu switch 80f, and a start button 80g are provided. Meanwhile, on the bottom surface of the housing 78, a concave portion is formed, and on the reward inclined surface of the concave portion, a B button 80h is provided. Each of the buttons (switches) 80a-80h is assigned an appropriate function depending on a game program to be executed by the game apparatus 12. Furthermore, the housing 78 has a power switch 80i for turning on and off the power of the main body of the game apparatus 12 from a remote place on a top surface. The respective buttons (switches) provided on the first controller 34 may inclusively be indicated as an operating means or an input means with the use of the reference numeral 80.

Within the housing 78, an acceleration sensor 84 (FIG. 11) for detecting accelerations in three-axis directions of X, Y and Z (that is, right and left direction, up and down direction and forward and reward direction) shown in FIG. 2 is provided. Alternatively, as an acceleration sensor 84, a two-axis acceleration sensor for detecting accelerations in any two directions out of the right and left direction, up and down direction and forward and reward direction may be used depending on the restriction on a shape of the housing 78, a way of holding the first controller 34, or the like. Under certain circumstances, a one-axis acceleration sensor may be used.

On the front surface of the housing 78, a light incident opening 78b is formed, and inside the housing 78, an imaged information arithmetic section 81 is further provided. The imaged information arithmetic section 81 is made up of a camera 81a for imaging infrared rays and an arithmetic operation portion 81b for calculating coordinates of imaged objects within an image, and captures an object scene including the above-described markers 22a and 22b by the infrared rays to calculate position coordinates of the markers 22a and 22b within the object scene.

On the rear surface of the housing 78, the above-described connector 42 is provided. The connector 42 is utilized for connecting other equipment to the first controller 34. In this embodiment, the connector 42 is connected with the connector 40 of the second controller 36 or the connector 106 of the gyro sensor unit 100.

Moreover, on the rear surface of the housing 78, a pair of through holes 82a and 82b is formed in such positions as to be symmetrically with each other (X-axis direction) about the connector 42. The pair of through holes 82a and 82b is for being inserted with hooks 112Fa and 112Fb (FIG. 6(A)) to securing the gyro sensor unit 100 at the rear surface of the housing 78. At the rear surface of the housing 78, a through hole 82c for attaching a strap 24 (FIG. 4(B)) is also provided.

FIG. 3 is an illustrative view showing one example of an appearance of the second controller 36 itself. FIG. 3(A) is a perspective view of the second controller 36 as seeing it from above rear, and FIG. 3(B) is a perspective view of the second controller 36 as seeing it from below front. In FIG. 3, the cable 38 of the second controller 36 is omitted.

The second controller 36 has a housing 86 formed by plastic molding, for example. The housing 86 is formed into an approximately thin long elliptical shape in the forward and backward direction (Z-axis direction) when viewed from plane, and the width of the right and left direction (X-axis direction) at the rear end is narrower than that of the front end. Furthermore, the housing 86 has a curved shape as a whole when viewed from a side, and downwardly curved from a horizontal portion at the front end to the rear end. The housing 86 has a size small enough to be held by one hand of a child and an adult similar to the first controller 34 as a whole, and has a longitudinal length (in the Z-axis direction) slightly shorter than that of the housing 78 of the first controller 34.

Even with the second controller 36, the player can perform a game operation by operating buttons and a stick, and by changing a position and a direction of the controller itself.

At the front end of the top surface of the housing 86, an analog joystick 88a is provided. At the end of the housing 86, a front edge slightly inclined backward is provided, and on the front edge, a C button 88b and a Z button 88c are vertically (Y-axis direction in FIG. 3) provided. The analog joystick 88a and the respective buttons 88b and 88c are assigned appropriate functions according to a game program to be executed by the game apparatus 12. The analog joystick 88a and the respective buttons 88b and 88c provided to the second controller 36 may be inclusively denoted by means of the reference numeral 88.

Inside the housing 86 of the second controller 36, an acceleration sensor 90 (FIG. 11) is provided. As the acceleration sensor 90, an acceleration sensor similar to the acceleration sensor 84 in the first controller 34 is applied. More specifically, a three-axis acceleration sensor is applied in this embodiment, and detects accelerations in each of the three axis directions such as an up and down direction (Y-axial direction shown), a right and left direction (X-axial direction shown), and a forward and backward direction (Z-axial direction shown) of the second controller 36. Accordingly, similar to the case of the first controller 34, proper arithmetic process is performed on the detected accelerations to thereby calculate a tilt and a rotation of the second controller 36 and an attitude of the acceleration sensor 90 in the direction of gravity. Furthermore, it is possible to calculate a motion applied to the first controller 34 by swinging, etc. as with the case of the second controller 36.

Figure 4:
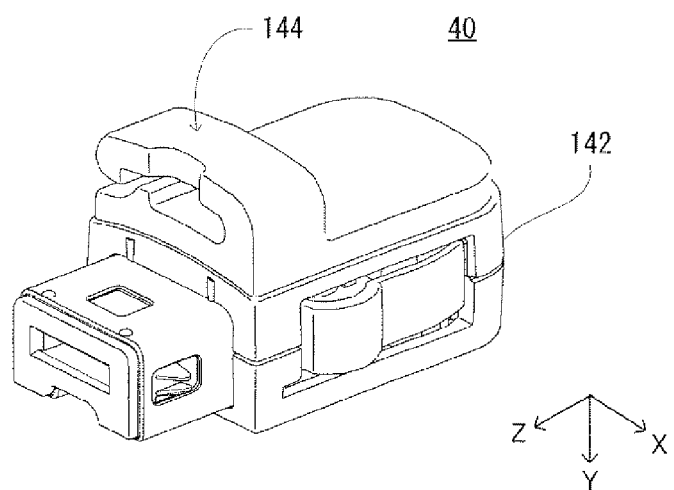
FIG. 4 is an illustrative view showing an appearance of a connector of the second controller.
Figure 5:
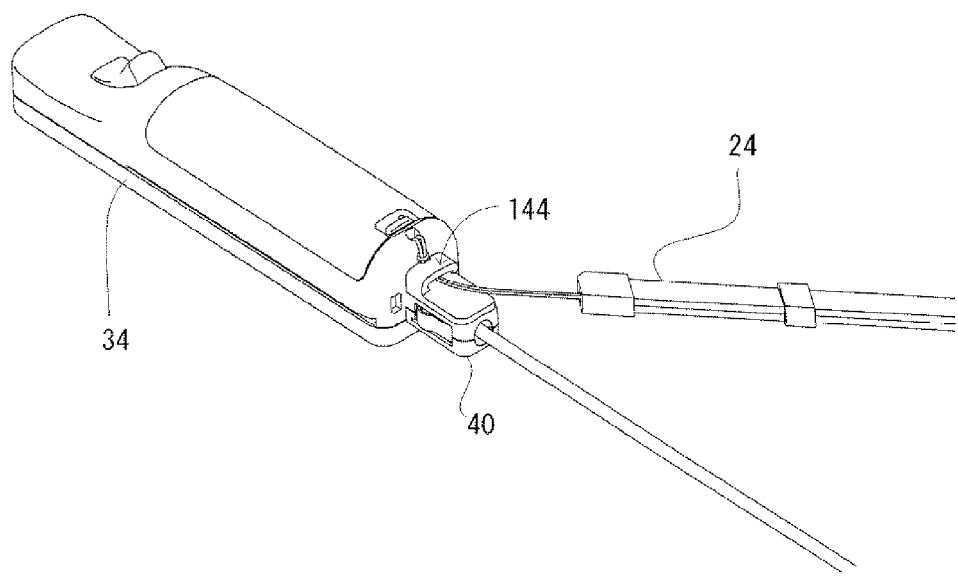
FIG. 5 is an illustrative view showing a manner in which a cord of a strap attached to the first controller is hung and retained with a hook of the connector in a state that the connector of the second controller is connected the first controller.
Figure 7:
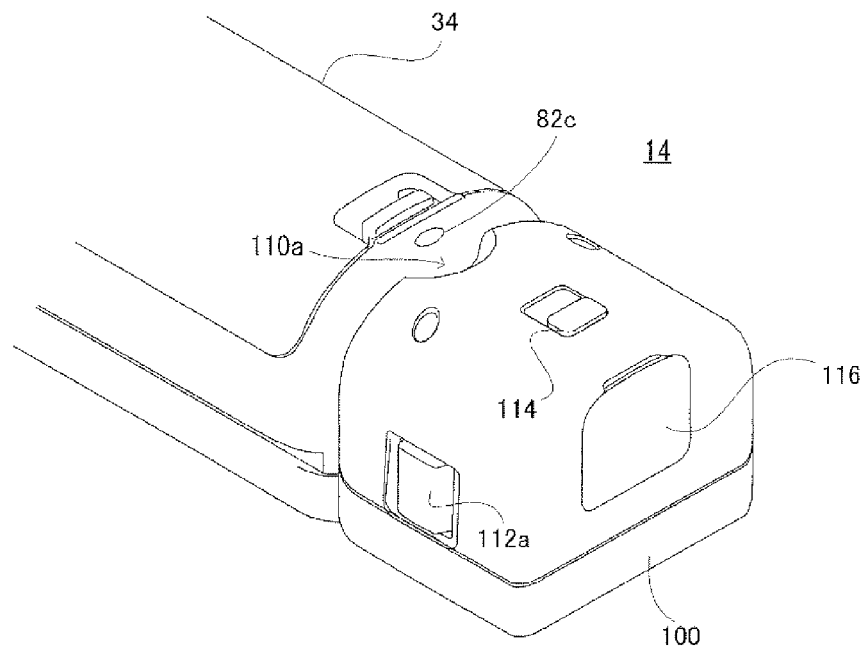
FIG. 7 is an illustrative view showing a state the gyro sensor unit is attached to the first controller.

FIG. 4 shows one example of an appearance of the connector 40 of the second controller 36. FIG. 4 is a perspective view of the connector 40 as seeing it from below front. Here also, the cable 38 is omitted. The connector 40 has a housing 142 formed by a plastics molding, for example. At the bottom surface of the housing 142, a hook 144 is provided. The hook 144 is for intrinsically hanging and retaining a cord of the strap 24 attached to the first controller 34 when the connector 40 is directly connected to the first controller 34 (or the connector 42) as shown in FIG. 5. By hanging and retaining the cord of the strap 24 on the hook 144, it is possible to prevent the connectors from being disengaged and flown even if the first controller 34 and the second controller 36 are pulled well.

FIG. 6 shows one example of an appearance of the gyro sensor unit 100. FIG. 6(A) is a perspective view of the gyro sensor unit 100 as seeing it from above front, and FIG. 6(B) is a perspective view of the gyro sensor unit 100 as seeing it from rear back.

The gyro sensor unit 100 has a housing 110 formed by a plastics molding, for example. The housing 110 has an appropriately rectangular parallelepiped shape, and the length is ⅕ of the length of the housing 78 of the first controller 34, and the width and thickness are approximately the same as those of the housing 78. The player can play a game operation by changing a position and a direction of the first controller 34 itself even if the first controller 34 is attached with the gyro sensor unit 100.

On the front surface and the rear surface of the housing 110, the above-described connectors 106 and 108 are respectively provided, on the side surfaces of the housing 110, a pair of release buttons 112a and 112b are provided, and the bottom surface of the housing 110, a lock switch 114 is provided. An approximately sphere concave portion 110a is provided from the end of the front surface of the housing 110 to the bottom surface such that the through hole 82c for the strap 24 is exposed in a state that the first controller 34 is attached with the gyro sensor unit 100 (FIG. 8).

The pair of release buttons 112a and 112b, and a pair of hooks 112Fa and 112Fb which are respectively associated with the release buttons 112a and 112b are provided on a front surface of the housing 110 at positions symmetrically with each other in a horizontal direction (X-axis direction) about the connector 106. When the connector 106 is connected to the connector 42 in order to attach the gyro sensor unit 100 to the first controller 34, the pair of hooks 112Fa and 112Fb are inserted to the pair of through holes 82a and 82b (FIG. 2(A)) at the rear surface of the housing 78, and the pawls of the hooks 112Fa and 112Fb are engaged with the inner wall of the housing 78. Thus, the gyro sensor unit 100 is fixed to the rear surface of the first controller 34.

Figure 8:
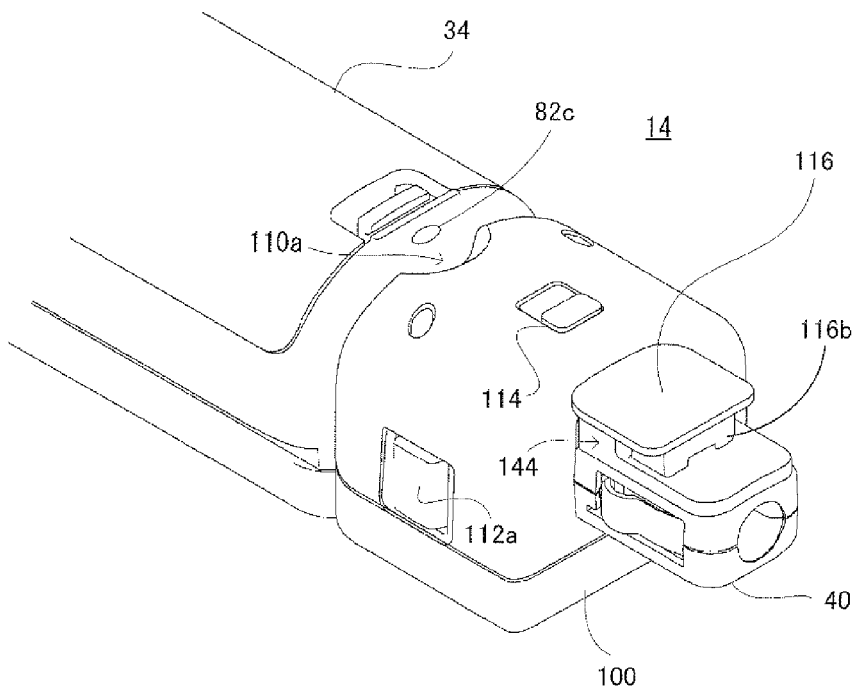
FIG. 8 is an illustrative view showing a state in which the second controller is connected to the first controller via the gyro sensor unit.

FIG. 8 shows the gyro sensor unit 100 thus attached to the first controller 34. When the pair of release buttons 112a and 112b are pushed in this state, the engagement of the pawls are released to allow the gyro sensor unit 100 to be detached from the first controller 34.

A lock switch 114 is a sliding switch for locking such the release buttons 112a and 112b. The release buttons 112a and 112b cannot be pushed (locked state) when the lock switch 114 is in a first position (toward the rear side, for example), and the release buttons 112a and 112b can be pushed (released state) when the lock switch 114 is in a second position (toward the front, for example). Within the housing 110, locking springs 118a and 118b (FIG. 7) are provided and constructed so as to be repulsed when the release button 112a and 112b are pushed, and so as to maintain the engaged state when the release button 112a and 112b are not pushed. Thus, in order to remove the gyro sensor unit 100, the user has to push the release buttons 112a and 112b after sliding the lock switch 114 from the first position to the second position.

Since the gyro sensor unit 100 is attached to the rear surface of the first controller 34, a centrifugal force applied to the gyro sensor unit 100 during the game is exclusively worked such that the gyro sensor unit 100 is pressed against the first controller 34. Furthermore, the gyro sensor unit 100 is fixed to the rear surface of the first controller 34 by the hooks 112Fa and 112Fb while the lock switch 114 for releasing the hooks 112Fa and 112Fb is provided to the release buttons 112a and 112b, and therefore, even during operating the game, it is possible to bring about a tightly secured state between the gyro sensor unit 100 and the first controller 34.

On the rear surface of the housing 110, a concave portion 110b capable of housing the connector cover 116 to be attached to the connector 108 is provided on the periphery of the connector 108. The connector cover 116 has a narrow thin (that is, can be bended) protrusion 116a extending in a forward and backward (Z-axis direction) direction on the one end of the main surface. The end portion of the protrusion 116a is engaged with the housing 110, and the connector cover 116 is captive from the housing 110 in a state that it is removed from the connector 108.

Figure 9:
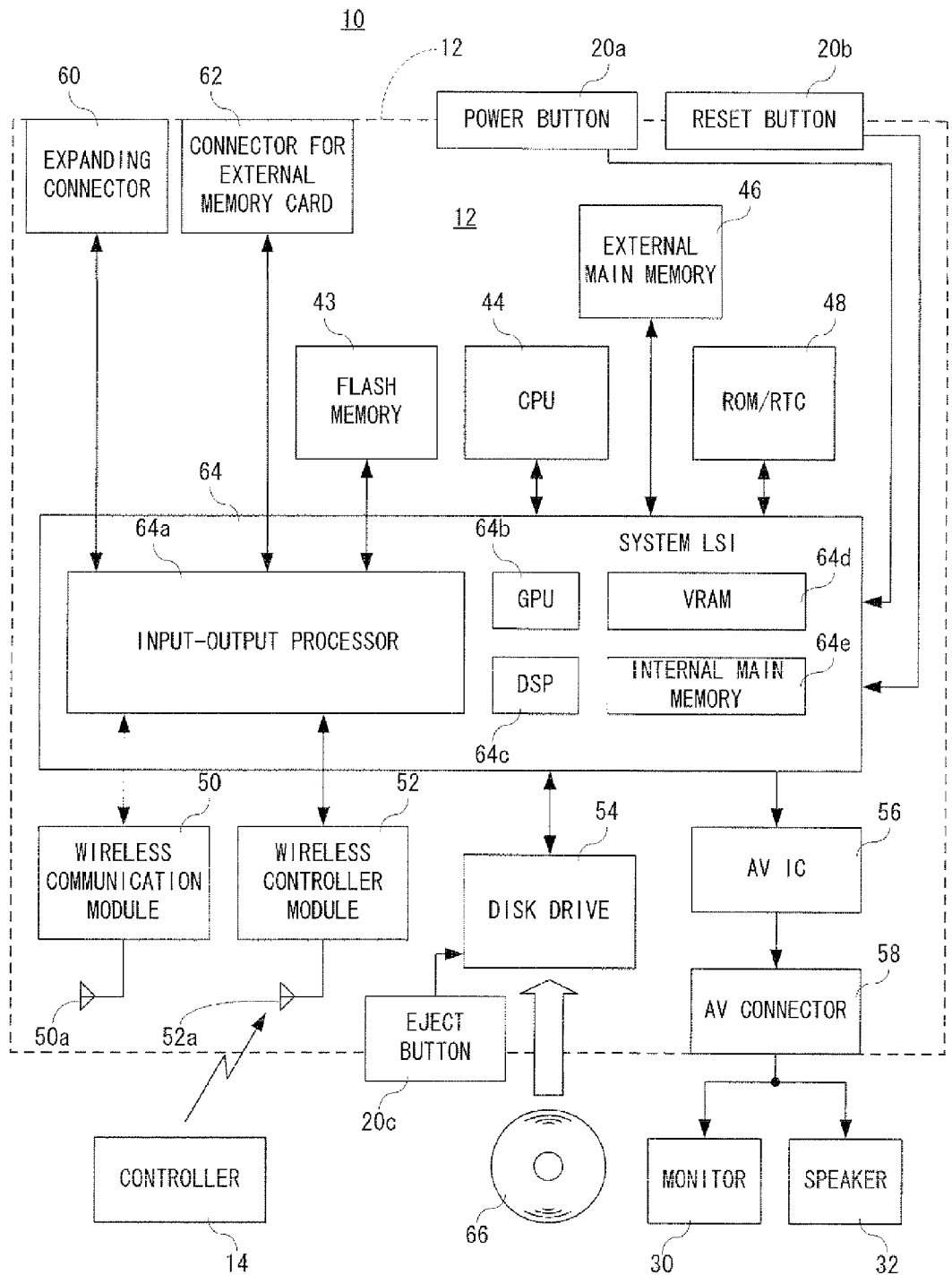
FIG. 9 is a block diagram showing an electric configuration of FIG. 1 embodiment.

The connector cover 116 has a narrow thick (that is, is hard to bend) protrusion 116b extending in a right and left direction (X-axis direction) on the other end of the main surface. The thickness (height of the Z-axis direction) of the protrusion 116b is approximately the same as the thickness (height of the Y-axis direction) of the hook 144 (FIG. 4) provided to the connector 40 of the second controller 36. In a case that the second controller 36 is connected to the first controller 34 via the gyro sensor unit 100, the main surface of the connector cover 116 is made level to be engaged with the side surface of the hook 144 of the protrusion 116b as shown in FIG. 9. By thus incorporating the connector cover 116 detached from the connector 108 into the connector 40, the connector 40 is tightly secured to the gyro sensor unit 100 as well as is improved in operability and appearance.

Although illustration is omitted, the gyro sensor unit 100 includes a gyro sensor, and the gyro sensor is made up of two chips including one-axis gyro sensor and two-axis gyro sensor. The former is for detecting an angular velocity (angular velocity about the Y axis) relating to a yaw angle, and the latter is for detecting two angular velocities (angular velocity about the Z axis and angular velocity about the X axis) relating to a roll angle and a pitch angle. Here the gyro sensor is not restricted to the two-axis configuration, and may be three one-axis gyro sensors (three chips) and may be one three-axis gyro sensor (one chip). In either case, a position and a direction of each of the chips are decided so as to properly detect the above-described three angular velocities. In addition, under certain circumstances, the gyro sensor 104 may be made up of one two-axis gyro sensor, or may be mad up of one or two one-axis gyro sensor. It should be noted that the shapes of the first controller 34 shown in FIG. 2, the second controller 36 shown in FIG. 3 and FIG. 4 and the gyro sensor unit 100 shown in FIG. 6, and the shape, the number and the setting position of the button (switch or stick, etc.) are merely one example, and may be changed to another shape, number and setting position, etc. as necessary.

Here, the sensor is a gyro sensor (angular velocity sensor) in a preferred embodiment, but may be other motion sensors, such as an acceleration sensor, a velocity sensor, a displacement sensor, a rotation angle sensor, etc., and may be a combination of plurality of motion sensors.

In addition, the power source of the controller 14 is applied by a battery (not illustrated) which is replaceably accommodated in the first controller 34. The power is supplied to the second controller 36 via the connector 40 and the cable 38. If the gyro sensor unit 100 is connected to the first controller 34, the power is supplied to the gyro sensor unit 100 via the connectors 42 and 106. Alternatively, if the second controller 36 is connected to the gyro sensor unit 100, a part of the power supplied from the first controller 34 to the gyro sensor unit 100 is also applied to the second controller 36 via the connector 108, the connector 40 and the cable 38.

Figure 10:
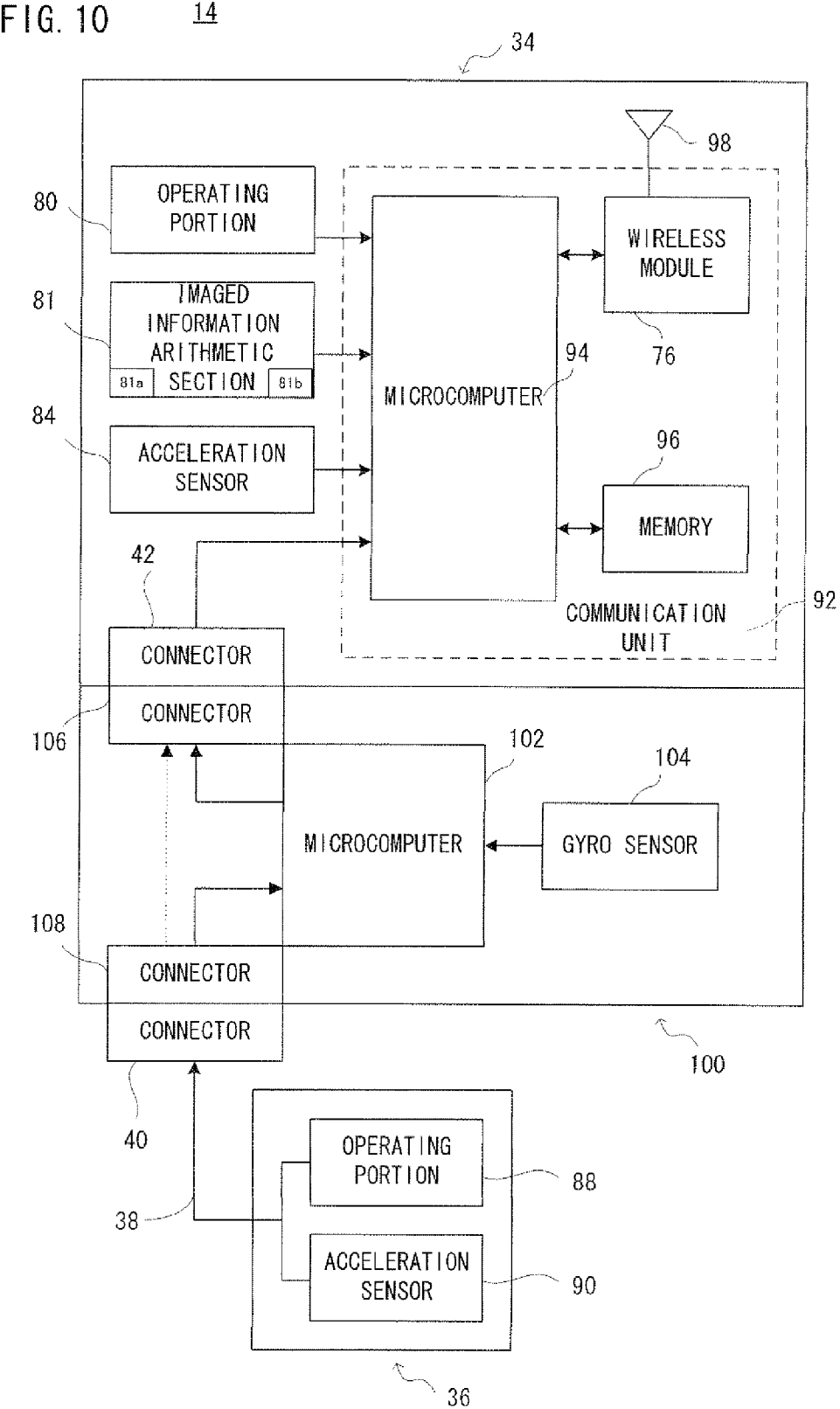
FIG. 10 is a block diagram showing an electric configuration of all the controllers applied to FIG. 1 embodiment.

FIG. 10 shows an electric configuration of the game system 10. Although illustration is omitted, respective components within the housing 16 are mounted on a printed-circuit board. As shown in FIG. 10, the game apparatus 12 is provided with a CPU 44, and functions as a game processor. Furthermore, the CPU 44 is connected with a system LSI 64. The system LSI 64 is connected with an external main memory 46, a ROM/RTC 48, a disk drive 54 and an AV IC 56.

The external main memory 46 is utilized as a work area and a buffer area of the CPU 44 by storing programs such as a game program, etc. and various data. The ROM/RTC 48, which is a so-called boot ROM, is incorporated with a program for activating the game apparatus 12, and is provided with a time circuit for counting a time. The disk drive 54 reads program, texture data, etc. from the optical disk 66, and writes them in an internal main memory 64e described later or the external main memory 46 under the control of the CPU 44.

The system LSI 64 is provided with an input-output processor 64a, a GPU (Graphics Processor Unit) 64b, a DSP (Digital Signal Processor) 64c, a VRAM 64d and an internal main memory 64e, and these are connected with one another by internal buses although illustration is omitted.

The input-output processor (I/O processor) 64a executes transmission and reception of data and executes download of the data.

The GPU 64b is made up of a part of a drawing means, and receives a graphics command (construction command) from the CPU 44 to generate game image data according to the command. Additionally, the CPU 44 applies an image generating program required for generating game image data to the GPU 64b in addition to the graphics command.

Although illustration is omitted, the GPU 64b is connected with the VRAM 64d as described above. The GPU 64b accesses the VRAM 64d to acquire data (image data: data such as polygon data, texture data, etc.) required to execute the construction command. Here, the CPU 44 writes image data required for drawing to the VRAM 64d via the GPU 64b. The GPU 64b accesses the VRAM 64d to produce game image data for drawing.

In this embodiment, a case that the GPU 64b generates game image data is explained, but in a case of executing an arbitrary application except for the game application, the GPU 64b generates image data as to the arbitrary application.

Furthermore, the DSP 64c functions as an audio processor, and generates audio data corresponding to a sound, a voice, music, or the like to be output from the speaker 32 by means of the sound data and the sound wave (tone) data stored in the internal main memory 64e and the external main memory 46.

The game image data and audio data which are generated as described above are read by the AV IC 56 and output to the monitor 30 and the speaker 32 via the AV connector 58. Accordingly, a game screen is displayed on the monitor 30, and a sound (music) necessary for the game is output from the speaker 32.

Furthermore, the input-output processor 64a is connected with a flash memory 43, a wireless communication module 50 and a wireless controller module 52, and is also connected with an expanding connector 60 and a connector for external memory card 62. In addition, the wireless communication module 50 is connected with an antenna 50a, and the wireless controller module 52 is connected with an antenna 52a.

The input-output processor 64a can communicate with other game apparatuses and various servers to be connected to a network (not shown) via the wireless communication module 50. It should be noted that it is possible to directly communicate with another game apparatus without going through the network. The input-output processor 64a periodically accesses the flash memory 43 to detect the presence or absence of data (referred to as data to be transmitted) being required to be transmitted to a network, and transmits it to the network via the wireless communication module 50 and the antenna 50a in a case that data to be transmitted is present. Furthermore, the input-output processor 64a receives data (referred to as received data) transmitted from another game apparatuses via the network, the antenna 50a and the wireless communication module 50, and stores the received data in the flash memory 43. In a case that the received data does not satisfy a constant condition, the received data is abandoned as it is. In addition, the input-output processor 64a receives data (download data) downloaded from the download server (not shown) via the network, the antenna 50a and the wireless communication module 50, and stores the download data in the flash memory 43.

Furthermore, the input-output processor 64a receives input data transmitted from the controller 14 via the antenna 52a and the wireless controller module 52, and (temporarily) stores it in the buffer area of the internal main memory 64e or the external main memory 46. The input data is erased from the buffer area after being utilized in the processing by the CPU 44 (game processing, for example).

In this embodiment, as described above, the wireless controller module 52 makes communications with the controller 14 in accordance with the Bluetooth standard. This makes it possible for the game apparatus 12 to not only fetch data from the controller 14 but also to transmit a predetermined command to the controller 14 and control a motion of the controller 14 from the game apparatus 12.

In addition, the input-output processor 64a is connected with the expanding connector 60 and the connector for external memory card 62. The expanding connector 60 is a connector for interfaces, such as USB, SCSI, etc., and capable of connecting medium such as an external storage and peripheral devices such as another controller different form the controller 14. Furthermore, the expanding connector 60 is connected with a cable LAN adaptor, and capable of utilizing the cable LAN in place of the wireless communication module 50. The connector for memory card 62 can be connected with an external storage like a memory card 38. Thus, the input-output processor 64a, for example, accesses the external storage via the expanding connector 60 and the connector for external memory card 62 to store and read the data in and from the same.

Although detailed explanation is omitted, the game apparatus 12 (housing 16) is provided with a power button 20a, a reset button 20b and an eject button 20c. The power button 20a is connected with the system LSI 64. When the power button 20a is turned on, the system LSI 64 is set to a mode of a normal energized state in which the respective components of the game apparatus 12 are supplied with power through an AC adapter not shown.

The reset button 20b is also connected with the system LSI 64. When the reset button 20b is pushed, the system LSI 64 activates a started-up program of the game apparatus 12. The eject button 20c is connected to the disk drive 54. When the eject button 20c is pushed, the optical disk 66 is ejected from the disk drive 54.

FIG. 10 shows one example of an electric configuration of the controller 14 as a whole when the first controller 34 and the second controller 36 are connected via the gyro sensor unit 100.

The first controller 34 includes a communication unit 92, and the communication unit 92 is connected with the operating portion 80, the imaged information arithmetic section 81, the acceleration sensor 84, and the connector 42. The operating portion 80 indicates the above-described operation buttons or operation switches 80a-80i. When the operating portion 80 is operated, data indicating the operation is applied to the communication unit 92. From the imaged information arithmetic section 81, data indicating the position coordinates of the markers 22a and 22b within the object scene is output to the communication unit 92. The data indicating acceleration detected by the acceleration sensor 84 is also output to the communication unit 92. The acceleration sensor 84 has a sampling period in the order of 200 frames/seconds at maximum, for example.

The connector 42 is connected with the connector 106 of the gyro sensor unit 100. The gyro sensor unit 100 includes the microcomputer 102 and the gyro sensor 104 inside thereof. The gyro sensor 104 shows the above-described gyro sensors 104a and 104b, and has a sampling period similar to the acceleration sensor 84, for example, The microcomputer 102 outputs to the communication unit 92 data indicating the angular velocity detected by the gyro sensor 104 via the connector 106 and the connector 42.

The connector 108 of the gyro sensor unit 100 is connected with the connector 40 of the cable 38 extending from the second controller 36. The connector 40 is connected with an operating portion 88 and an acceleration sensor 90 of the second controller 36. The operating portion 88 shows the above-described stick 88*a* and operation buttons 88*b*, 88*c*. When the operating portion 88 is operated, data indicating the operation is applied to the microcomputer 102 of the gyro sensor unit 100 via the cable 38, the connector 40 and the connector 42. The microcomputer 102 outputs the data to the communication unit 92 via the connector 106 and the connector 42. The acceleration sensor 90 also has a sampling period similar to the acceleration sensor 84, and the data indicating the acceleration thus detected is also output to the communication unit 92 by the microcomputer 102.

Here, each output to the above-described communication unit 92 is executed at a cycle of ½₀₀ seconds. Accordingly, during arbitrary ½₀₀ seconds, operation data from the operating portion 80, position coordinate data from the imaged information arithmetic section 81, acceleration data from the acceleration sensor 84, angular velocity data from the gyro sensor 104, operation data from the operating portion 88, and acceleration data from the acceleration sensor 90 are output to the communication unit 92 once for each of them.

The communication unit 92 includes a microcomputer (microcomputer) 94, a memory 96, a wireless module 76 and an antenna 98. The microcomputer 94 transmits the controller data inclusive of the data (operation data, position coordinate data, acceleration data and angular velocity data) output as described to the game apparatus 12, and receives the data from the game apparatus 12 by controlling the wireless module 76 while utilizing the memory 96 as a memory area (working area or buffer area) in processing.

The wireless module 76 modulates a carrier at a predetermined frequency by the controller data, and emits its weak radio wave signal from the antenna 98 by using a short-range wireless communication technique, such as Bluetooth (trademarks). Namely, the controller data is modulated to the weak radio wave signal by the wireless module 76 and transmitted from the first controller 34. The weak radio wave signal is received by the Bluetooth communication unit 74 of the game apparatus 12. The weak radio wave thus received is subjected to demodulating and decoding processing, so that the game apparatus 12 can obtain the controller data. The CPU 44 of the game apparatus 12 performs the game processing on the basis of the controller data obtained from the controller 14. Here, the wireless communication between the first controller 34 and the game apparatus 12 may be executed according to another standard, such as a wireless LAN, etc.

Figure 11:
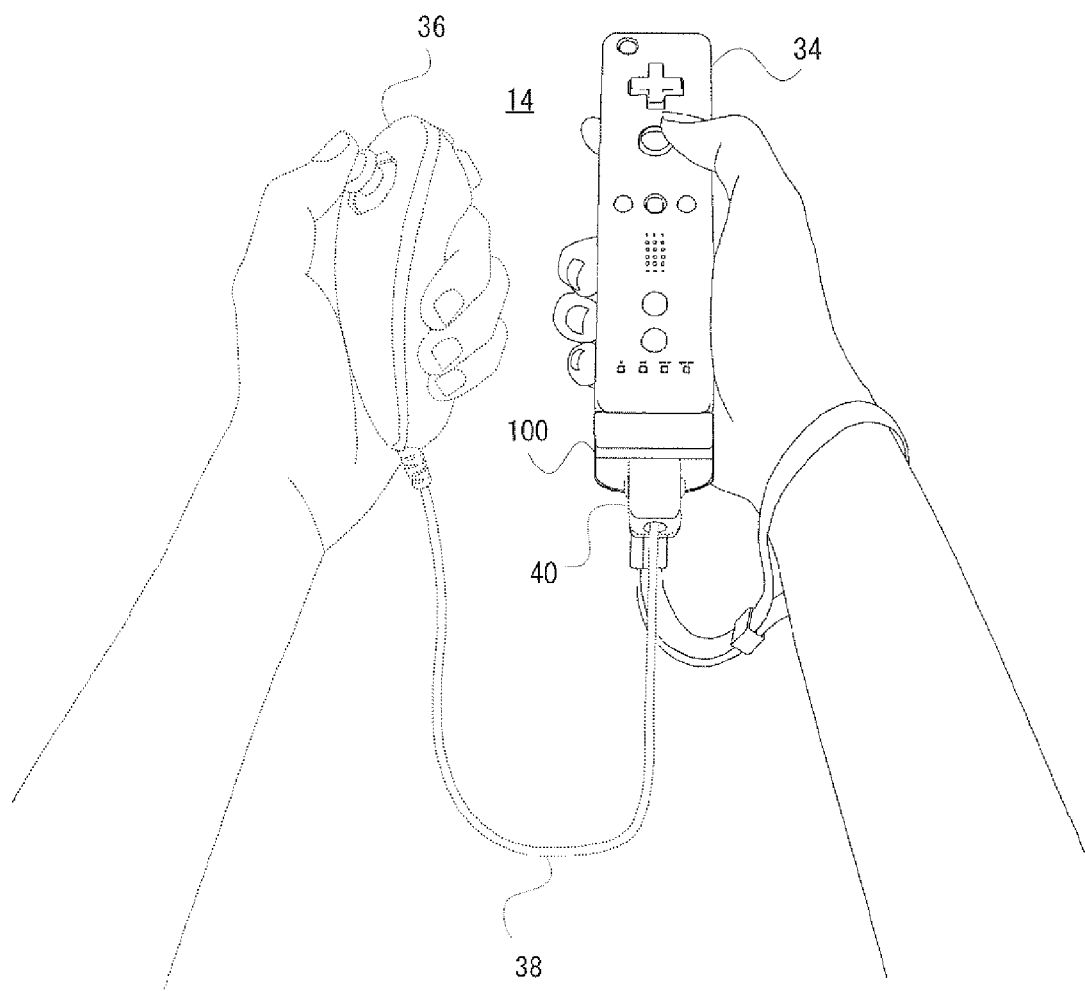
FIG. 11 is an illustrative view showing a situation in which a player operates the controllers.

In this game system 10, a user can make an input to an application like a game, or the like by moving the controller 14 itself other than a button operation. In playing the game, for example, the player holds the first controller 34 (specifically, holding portion 78*a* of the housing 78: FIG. 2) with the right hand and the second controller 36 with the left hand as shown in FIG. 11. As described above, the first controller 34 includes the acceleration sensor 84 for detecting accelerations in the three-axis directions, and the second controller 36 also includes the acceleration sensor 90 as described before. When the first controller 34 and the second controller 36 are moved by the player, acceleration values in the three-axis directions indicating the motions of the respective controllers are detected by the acceleration sensor 84 and the acceleration sensor 90. In a case that the gyro sensor unit 100 is attached to the first controller 34, angular velocity values about the three-axes indicating the motion of the first controller 34 itself are further detected.

These detected values are transmitted to the game apparatus 12 in a form of the aforementioned controller data. In the game apparatus 12 (FIG. 9), the controller data from the controller 14 is received by the input-output processor 64*a* via the antenna 52*a* and the wireless controller module 52, and the received controller data is written to a buffer area of the internal main memory 64*e* or the external main memory 46. The CPU 44 reads the controller data stored in the buffer area of the internal main memory 64*e* or the external main memory 46, and restores the detected values, that is, the values of the acceleration and/or the angular velocity detected by the controller 14 from the controller data.

The CPU 44 may execute processing for calculating a velocity of the controller 14 from the restored acceleration in parallel with such a restoring processing. In parallel therewith, a travel distance or a position of the controller 14 can be evaluated from the calculated velocity. On the other hand, from the restored angular velocity, a rotation angle of the controller 14 is evaluated. Here, the initial value (constant of integration) when the accelerations are accumulated to calculate the velocity, and when the angular velocities are accumulated to calculate the rotation angle can be calculated froze. The position coordinate data from the imaged information arithmetic section 81, for example. The position coordinate data can also be used for correcting the errors accumulated due to the integration.

The game processing is executed on the basis of the variables thus evaluated, such as the acceleration, the velocity, the travel distance, the angular velocity, the rotation angle, etc. Accordingly, all of the processing described above need not to be executed, and the variables necessary for the game processing may be calculated as required. It should be noted that the angular velocity and the rotation angle can also be calculated from the acceleration in principle, but this requires a complex routine for the game program, which also imposes a heavy processing load on the CPU 44. By utilizing the gyro sensor unit 100, a development of the program is made easy, and the processing load on the CPU 44 is reduced.

By the way, some games may be a game for single controller of utilizing only the first controller 34 and other games may be a game for two controllers of utilizing the first controller 34 and the second controller 36, and the respective games are classified into a gyro-compatible type and a gyro-incompatible type. The first controller 34 being a main controller is required for playing all the games. Furthermore, the second controller 36 being an expanding controller is connected to the first controller 34 via the gyro sensor unit 100 or directly when the game for two controllers is played, and is removed in general when the game for single controller is played.

On the other hand, the gyro sensor unit 100 being an expanding sensor or an expanding controller is not required when the gyro-incompatible game is played, but it is not required to take the trouble to be removed. Thus, the gyro sensor unit 100 generally remains to be attached to the first controller 34, and dealt as a single unit with the first controller 34. The second controller 36 is detachable similar to a case that the gyro sensor unit 100 is not involved except that the connection destination of the connector 40 is changed from the connector 42 to the connector 108.

Here, although detailed explanation is omitted, the microcomputer 102 of the gyro sensor unit 100 attached to the first controller 34 performs a mode selection among a plurality of control modes including a "gyro" and a "gyro & second controller" depending on whether or not the second controller 36 is connected with the gyro sensor unit 100 itself, or whether the game is gyro-compatible or non-gyro-compatible.

Figure 12:
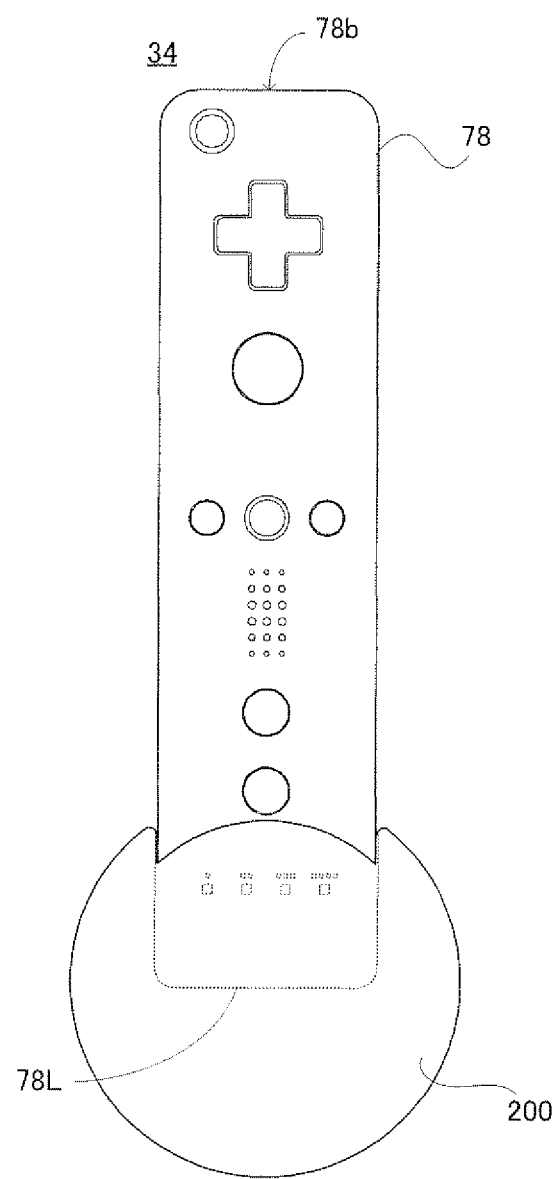
FIG. 12 is an illustrative view showing the first controller attached with an elastic member.

In the game system 10 configured as described above, by operating the first controller 34 like a joystick, it is possible to play a game which requires precise control of attitudes and motions, such as a flight simulator, a first-person shooting game, a robot operative game, a battle game, or the like. In this case, as shown in FIG. 12, an elastic member 200 is attached to a lower end 78L (end opposite to the light incident opening 78b) of the housing 78 of the first controller 34. The elastic member 200 is made of an elastic member such as rubber, urethane, etc., and has a shape of substantially the sphere.

Figure 13:
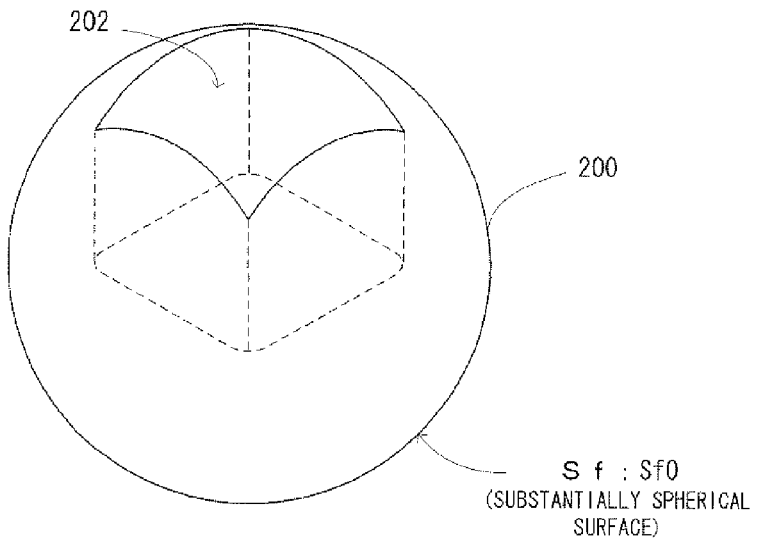
FIG. 13 is an illustrative view showing structure of the elastic member.

As shown in FIG. 13, on a surface Sf (substantially spherical surface Sf0) of the elastic member 200, a concave portion 202 is formed such that the lower end 78L of the housing 78 is exactly fitted into a quadrangular prism-shape (generally, a shape substantially the same as that of the lower end 78L). The concave portion 202 has a size vertically and horizontally the same or slightly smaller than the lower end 78L of the housing 78 so as to make attachment to and detachment from the housing 78 easy, and so as not to be disengaged during playing the game. The depth of the concave portion 202 is slightly shallower than that from the lower end to the Y button 80c so as to expose the Y button 80c positioned at the bottommost of the housing 78.

Figure 14:
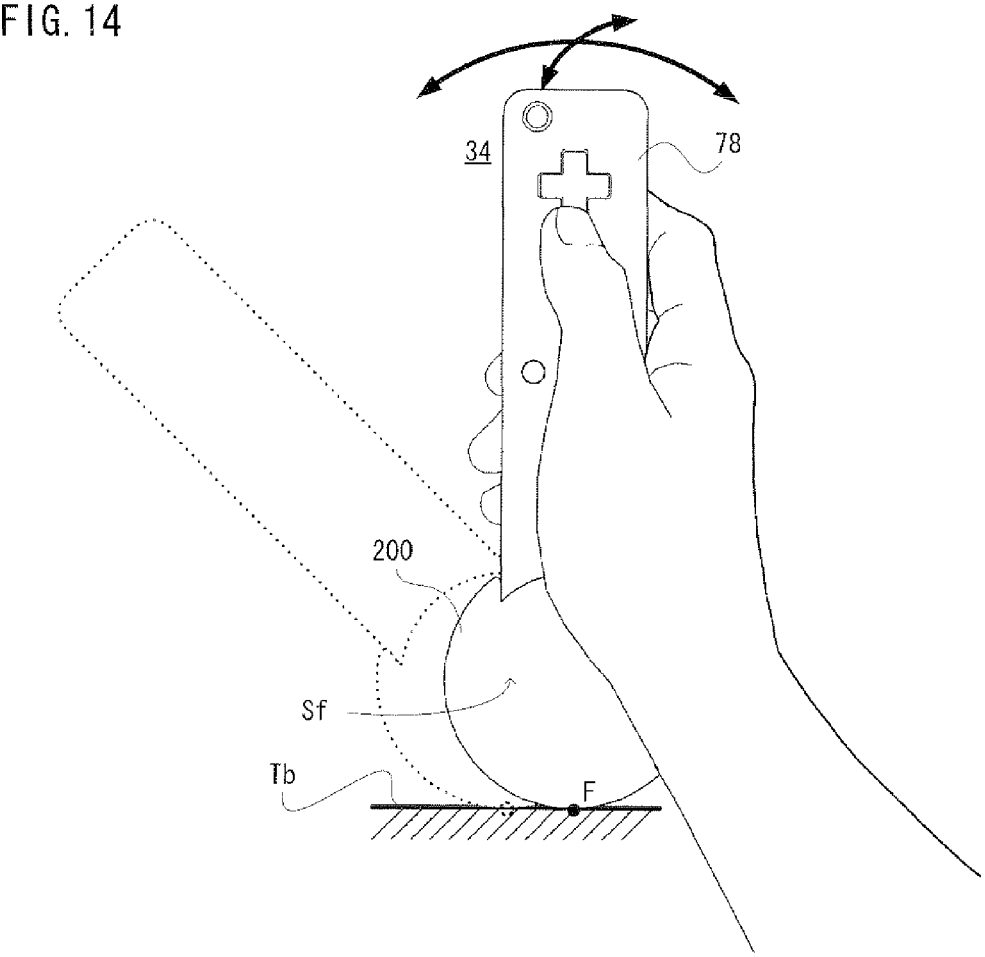
FIG. 14 is an illustrative view showing an example of an operation of the first controller attached with the elastic member.

The player performs operations of the various buttons 80a-80h while holding the first controller 34 (hereinafter referred to as "first controller 34") attached with the elastic member 200 as shown in. FIG. 14, bringing a part of the surface Sf of the elastic member 200 into contact with a surface of the table Tb, and performing a tilting operation of the first controller 34, regarding the contact point or the contact surface as a fulcrum F (joystick-like operation). In response thereto, the controller data as described above is transmitted from the first controller 34, and then, the game apparatus 12 receives the controller data to execute the game processing.

Figure 15:
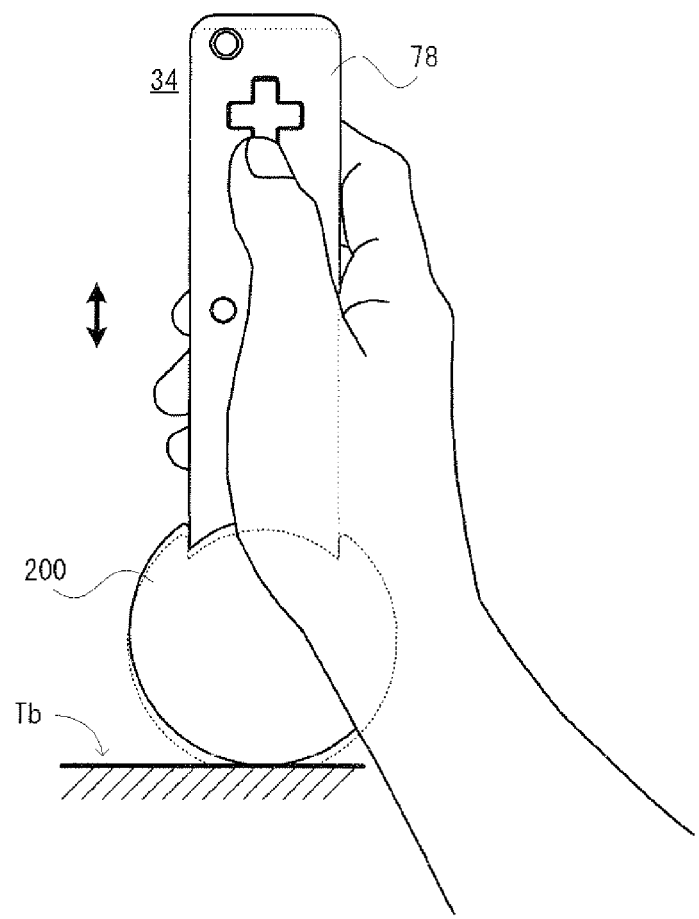
FIG. 15 is an illustrative view showing another example of an operation of the first controller attached with the elastic member.

The player can perform an operation of pressing the first controller 34 against the surface of the table Tb as shown in FIG. 15 (this is callused a "pushing operation"). If this is combined with the joystick-like operation, various operations can be performed, such as taking an aim at a target by the joystick-like operation, and firing a gun with the pushing operation in the first-person shooting game.

Figure 16:
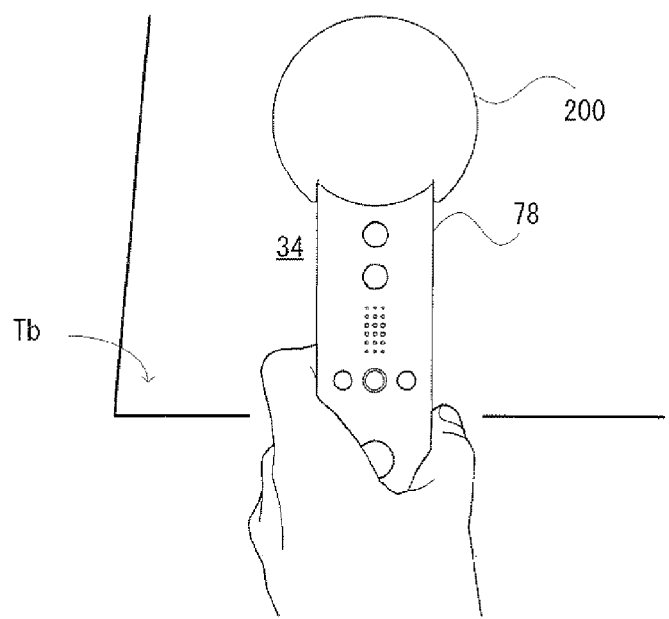
FIG. 16 is an illustrative view showing a still another example of the operation of the first controller attached with the elastic member.

In examples of FIG. 14 and FIG. 15, the lower end of the first controller 34 is held, but as shown in FIG. 16, the player may hold an upper end (the side opposite to that attached with the elastic member 200), and perform an operation of beating the surface of the table Tb with the elastic member 200 (this may be called "beating operation").

In this case, in the game system 10, processing according to a flowchart shown in FIG. 17 is executed. Here, the processing itself is not changed regardless of whether or not the elastic member 200 is attached to the first controller 34. FIG. 17(A) is a flowchart showing a side of the first controller 34 (microcomputer 94), and FIG. 17(B) is a flowchart showing a side of the game apparatus 12 (CPU 44).

Referring to FIG. 17(A), the microcomputer 94 acquires operation data from the operating portion 80, position coordinate data from the imaged information arithmetic section 81, and acceleration data from the acceleration sensor 84 in a first step S1. Here, in a case that the gyro sensor unit 100 is connected (coupled) to the first controller 34 (housing 78), angular velocity data from the gyro sensor 104 is further acquired, and in a case that the second controller 36 is connected, operation data from the operating portion 88 and acceleration data from the acceleration sensor 90 are further acquired. In a next step S3, controller data inclusive of the various data thus acquired is transmitted by the wireless module 98. Thereafter, the process returns to the step S1 to repeat the processing similar to the above description.

Referring to FIG. 17(B), the CPU 44 first receives controller data from the first controller 34 by the wireless controller module 52 in a step S11. Next, an attitude of the first controller 34 is calculated on the basis of the acceleration data and/or the angular velocity data included in the received controller data in a step S13a, and vibrations of the first controller 34 are detected on the basis of the acceleration data included in the received controller data in a step S13b. Here, the attitude can be calculated by only the acceleration data, but utilizing the angular velocity data as well allows the user to make calculation with high accuracy. The vibrations can be detected by evaluating a derivative value for each of the accelerations in three-axis directions from the acceleration data, and performing threshold value processing on them.

Then, in a step S15, on the basis of the calculated attitude and/or the detected vibrations and on the basis of the operation data and/or position coordinate data included in the received controller data, the game processing is executed. Thereafter, the process returns to the step S11 to perform the processing similar to the above description.

As understood from the above description, in this embodiment, the elastic member 200 is attached to the lower end 78L of the housing 78 of the first controller 34, and a part of the surface Sf of the elastic member 200 (substantially, spherical surface Sf0: complete spherical surface may be appropriate) is brought into contact with the surface of the table Tb, and the first controller 34 is tilted regarding the contact point (contact surface) as a fulcrum F. This eliminates differences among individuals in tilting manner, and enhances calculation accuracy of the attitude and detection accuracy of the vibration. Accordingly, it is possible to precisely control attitudes and motions by operating the first controller 34 like a joystick.

In this embodiment, a curvature R (inverse number of the radius) of the surface Sf of the elastic member 200 is constant (approximately constant), but this may be changed. An example of a surface Sf w having different curvatures R depending on the positions (cross-sectional view) is shown in. FIG. 18.

The surface Sf shown in FIG. 18(A) is made up of a bottom surface area Sf1 including the lower end L and side surface areas Sf2 other than this, and a curvature R2 of the side surface area Sf2 is smaller than a curvature R1 of the bottom surface area Sf1 (curve is gentle). Especially, the curvature R2 of the side surface area Sf2 may be 0 as shown in FIG. 18(B) (that is, the side surface area Sf2 is planar), and thus, the player can know the limitation of the tilt. Under certain circumstances, the curvature R2 may be a negative value, that is, a state the side surface areas Sf2 are curled (concave surface).

On the other hand, the bottom surface area Sf1 is a curved surface, but the curved surface is not required to be smooth, and this may be a substantially curved surface formed by a plurality of planes Sf10, Sf11, Sf12, . . . as shown in FIG. 18(C). In this case, the player tactually perceives the border (edge) between the planes through the first controller 34, and thus can obtain a unique operational feeling, and intuitively know a degree of tilt.

Here, in the example shown in FIG. 18, the curvature R is changed in two levels, but may be changed in three or more levels or may continuously be changed.

Thus, by stepwise and continuously changing the curvature R of the surface Sf of the elastic member 200, the player can have a different operational feeling depending on the angle at which the first controller 34 is tilted.

Figure 19:
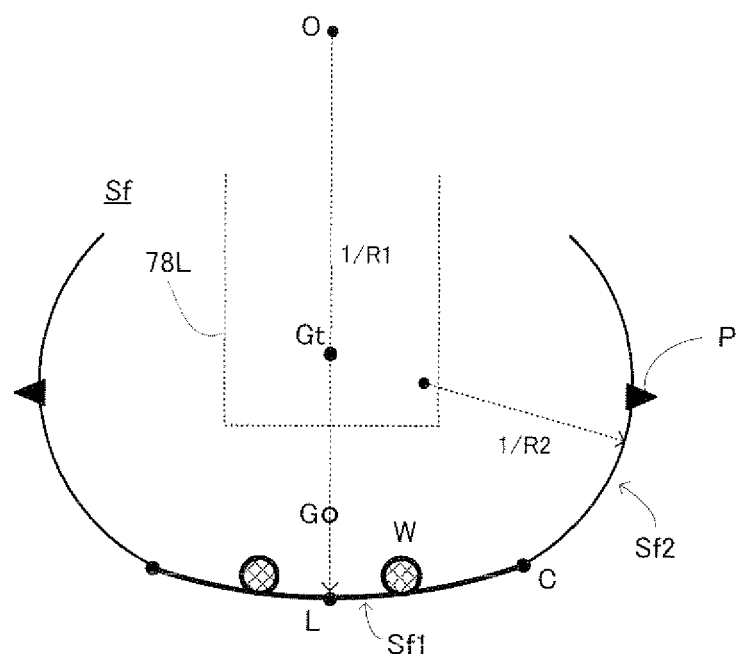
FIG. 19 is an illustrative view showing another configuration example of the surface of the elastic member, and shows a surface being made up of two curved surfaces different in curvature (in a case that the curvature of the bottom surface is small)

On the contrary to the example in FIG. 18, the curvature R1 of the bottom surface area Sf1 is made smaller than the curvature R2 of the side surface area Sf2. This allows the first controller 34 to take a neutral position (typically, standing posture). In view of easiness of taking the neutral position, the bottom surface area Sf1 may be plane (R1=0). Furthermore, in order to easily make the first controller 34 upright (stand up by itself from the tilted situation), an anchor W may be arranged in the vicinity of the bottom surface area Sf1 (especially, directly on the lower end L or around it). In FIG. 19, such a surface Sf is illustrated.

As to the surface Sf in FIG. 19, the anchor W is arranged so as to enclose the lower end L of the bottom surface area Sf1, and thus, a center of gravity G of the elastic member 200 is positioned directly on and in the vicinity of the lower end L. Accordingly, if the weight of the elastic member 200 is enough for the body of the first controller 34, the first controller 34 stands up in a manner like a "tumble doll".

More specifically, if the center of gravity Gt of the entire first controller 34 including the elastic member 200 is positioned below a center of curvature O of the bottom surface area Sf1 (between the center of curvature O and the bottom surface area Sf1), the first controller 34 can stands up by itself. That is, when the first controller 34 is tilted, resilience (feedback by gravity) in response to the tilt works, so that the first controller 34 tends to return to the neutral position spontaneously. The hand of the player holding the first controller 34 perceives feedback although it is less.

Here, as a method of bringing the center of gravity Gt between the center of the curvature O and the bottom surface area Sf1, there is a method of making the center of curvature O far away from the bottom surface area Sf1 by making the curvature R1 of the bottom surface area Sf1 small other than the method of bringing the center of gravity Gt close to the bottom surface area Sf1 by weighting the elastic member 200, especially weighting the proximity to the curved surface as described above.

Additionally, the first controller 34 in FIG. 19 is upright at the neutral position, but by unevenly distributing the anchor W, the first controller 34 may be appropriately tilted at the neutral position.

Furthermore, in the examples shown in FIG. 13 and FIG. 18, by arranging a heavier anchor W in the vicinity of the bottom surface area Sf1, the first controller 34 can stand up by itself. Even if it cannot stand up by itself, the position of the center of gravity of the entire first controller 34 is brought downward, and thus, ease of operation of the joystick-like operation can be improved.

Furthermore, on the surface Sf shown in FIG. 19, in order to restrict the tilt of the first controller 34, at the position corresponding to the fulcrum F when the first controller 34 is tilted to approximately the horizontal position (tilted at 90 angles), protrusions P are provided. Such protrusions P need not be provided, and may be provided at two or more positions. For example, if at the borders (point of inflection C) between the bottom surface area Sf1 and the side surface area Sf2, small protrusions may provided, the player can clearly perceive the neutral position. On each surface Sf shown in FIG. 18(A)-FIG. 18(C), similar protrusions may be provided.

FIG. 20 shows one example of an elastic member 200 taking a complex shape. The elastic member 200 is made up of a diskform base Bs and a holder Hd taking a shape of quadrangular prism as shown in FIG. 20(A). The holder Hd is provided so as to be tilted at a predetermined angle (15 angles, for example) on a top surface USf of the base Bs, and the lower end 78L of the housing 78 is accommodated in the holder Hd as shown in FIG. 20(B). Accordingly, the first controller 34 is tilted at the neutral position as shown in FIG. 20(C). This tilt helps the player easily hold the first controller 34 in operation, and brings the position of the center of gravity 34 downward to thereby improve the operability. Furthermore, on a front surface of the holder Hd, a slit St having a width about one-third of the front surface is formed, and the X button 80b and the Y button 80c are exposed from this slit St.

On the other hand, the base Bs has hollow-body structure, and inside this, that is, at the directly on the lower surface LSf of the base Bs, an anchor (not illustrated) for bringing the position of the center of gravity downward is arranged. The weight of the anchor is decided such that the position of the center of gravity Gr of the entire first controller 34 including the elastic member 200 is coincident with a desired position, for example, the position of the X button 80b. At this time, the center of gravity of the elastic member 200 (not illustrated) is brought to the middle between the upper surface USf and the lower surface LSf.

Then, the lower surface LSf of the base Hs has a shape along a substantially spherical surface (approximately constant curvature), and the center of curvature O is at the position approximately the same as that of the menu switch 80f, for example. Accordingly, the center of gravity Gt of the entire first controller 34 is lower than the center of curvature O of the lower surface LSf (positioned between the center of curvature O and the lower surface LSl), and therefore, the first controller 34 can stand up by itself, and the operability of the joystick-like operation is improved.

Here, if the base Bs itself has enough weight, the anchor need not be provided. Here, if the anchor is used, it is convenient for appropriately changing the position of the center of gravity.

Furthermore, the lower surface LSf is not restricted to the shape along the substantially spherical surface, and may have a shape similar to that shown FIG. 18(A)-FIG. 18(C) and FIG. 19.

Figure 21:
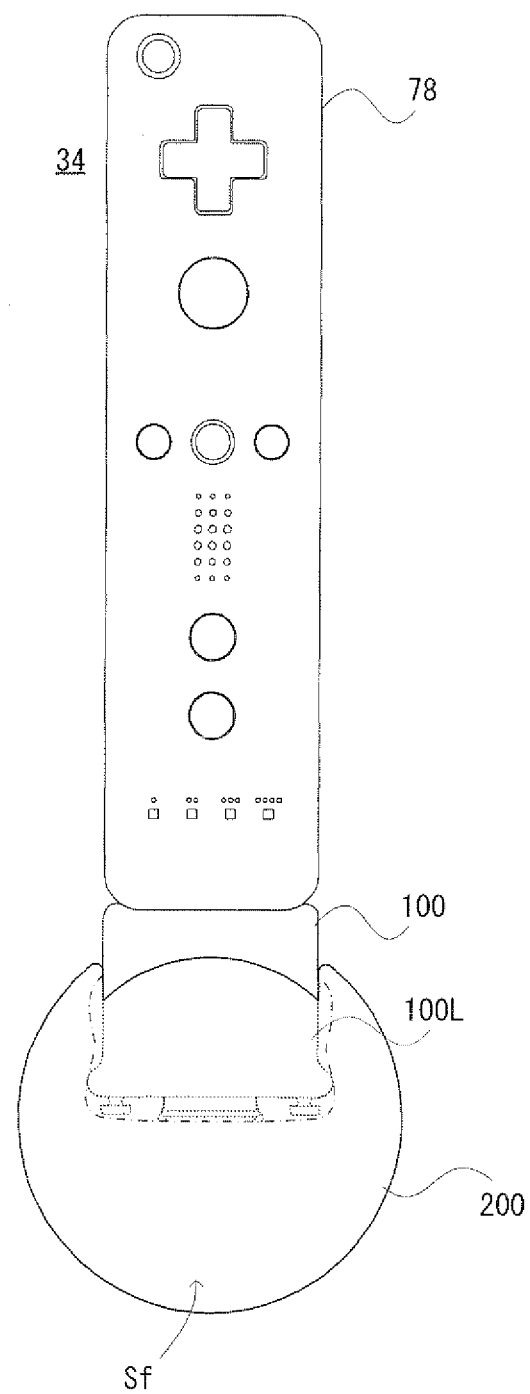
FIG. 21 is an illustrative view showing the first controller with gyro to which the elastic member is attached.

Furthermore, the elastic member 200 can be used with the first controller 34 which is even in a connected (coupled) state with the gyro sensor unit 100. More specifically, as shown in FIG. 21, at the lower end 100L (the end opposite to that connected with the first controller 34) of the gyro sensor unit 100, an elastic member 200 may be attached. Here, depending on the shape and size of the gyro sensor unit 100, or the material of the elastic member 200, it is difficult to use the elastic member 200 for the first controller 34 and the gyro sensor unit 100, so that a gyro-dedicated elastic member may be prepared. The gyro sensor unit 100 and the elastic member 200 may be integrated.

Figure 22:
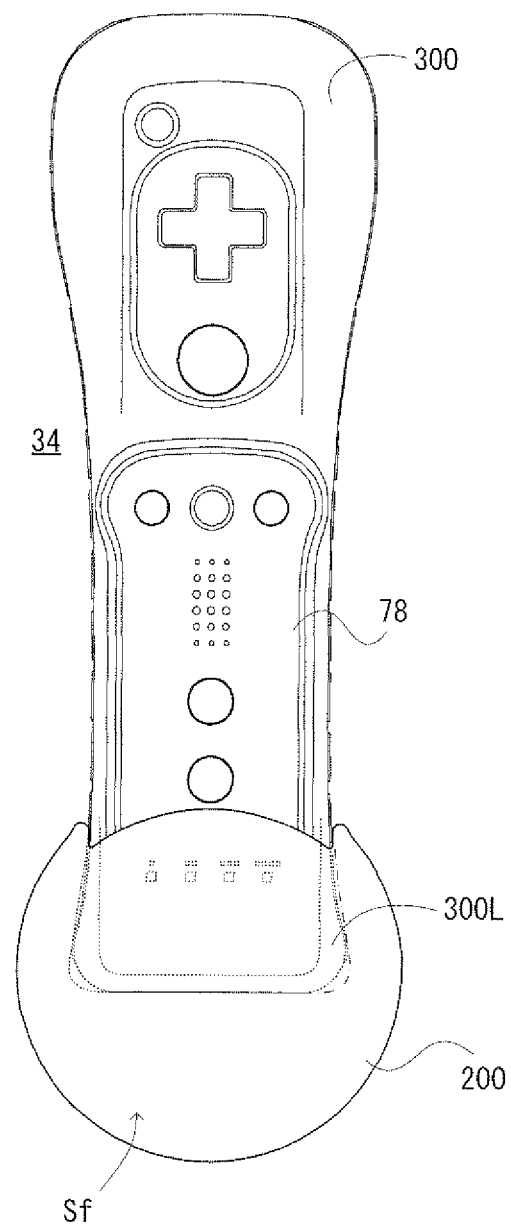
FIG. 22 is an illustrative view showing the first controller with jacket to which the elastic member is attached.

In addition, the elastic member 200 can be used with the first controller 34 attached with a jacket 300 as shown in FIG. 22. If it is difficult to use the elastic member 200 for both of the first controller 34 and the jacket 300, a jacket-dedicated elastic member may be prepared. The elastic member 200 may be formed to be integrated with the jacket 300.

Additionally, the operation method of the first controller 34 attached with the elastic member 200 is not restricted to the joystick-like operation, the pushing operation and the beating operation as described above. For example, by bringing a part of the surface Sf of the elastic member 200 into contact with a vertical wall surface, etc., and rotating the first controller 34 by taking the contact point or the contact surface as a fulcrum, the player can perform an operation as if he or she rows a boat. Moreover, the player may perform an operation of tilting the first controller 34 while bringing the elastic member 200 in contact with not the upper surface of the table but a lower surface of the table.

Figure 23:
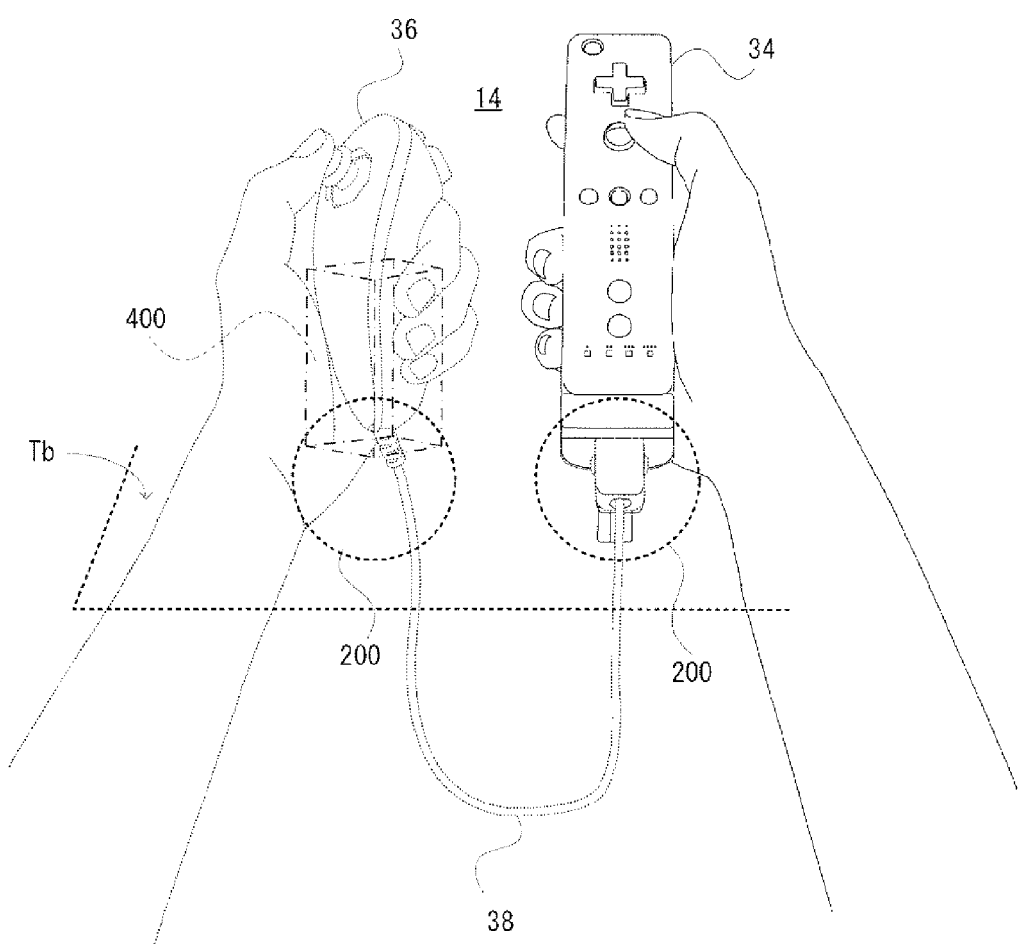
FIG. 23 is an illustrative view showing a situation in which the player operates the controller attached with the elastic member.

Furthermore, the elastic member 200 can be attached to the second controller 36 via an attachment 400 as shown in FIG. 23. Accordingly, if the two elastic members 200 and the attachment 400 are prepared, a joystick-like operation can be simultaneously performed with the first controller 34 and the second controller 36. Here, in this case, as to the elastic member 200 for the first controller 34, a further concave portion (not illustrated) is provided at the bottom of the concave portion 202 (see Figure) to accommodate the connector 40. In addition, in order to pulling the cable 38 connected to the connector 40 to the outside, a groove (not illustrated) is formed along a side surface of the concave portion 202, etc. The groove for pulling the cable 38 out may also be formed on the elastic member 200 for second controller 36.

The explanation is made by utilizing the game system 10 as one example, but the present invention can be applied to an information processing system executing information processing including applications other than the game on the basis of the motion of the operating device itself.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An operating device, comprising:
   a narrow housing;
   an acceleration sensor and/or a gyro sensor accommodated in or coupled to said housing;
   an operation data transmitter which transmits operation data inclusive of at least acceleration data and/or angular velocity data respectively acquired from said acceleration sensor and/or said gyro sensor; and
   an elastic member which is provided at one end or in proximity to the one end of said housing, wherein
   said elastic member has a spherical surface or substantially a spherical surface and a recess configure to insert a portion of said housing of the operating device into and hold said portion of said housing of the operating device, and
   said elastic member has a configuration enabling the operating device including the elastic member to stand up by itself on the spherical or the substantially spherical surface of the elastic member.

2. An operating device, comprising:
   a narrow housing;
   an acceleration sensor and/or a gyro sensor which are accommodated in or coupled to said housing;
   an operation data transmitter which transmits operation data inclusive of at least acceleration data and/or angular velocity data respectively acquired from said acceleration sensor and/or said gyro sensor; and
   an elastic member which is provided at one end or in proximity to the one end of said housing, wherein
   said elastic member has a curved surface on a side being opposite to a side attached to said housing, and positions a center of gravity of said operating device entire including said elastic member between a center of curvature of said curved surface and said curved surface by being attached to said housing, and
   said elastic member has a configuration enabling the operating device entire including the elastic member to stand up by itself on the curved surface of the elastic member.

3. An operating device according to claim 1, wherein said elastic member is detachably attached to the one end of said housing.

4. An operating device according to claim 1, further comprising:
   a camera provided to said housing at an end being opposite to the end attached with said elastic member, and
   said operating device configures to calculate position information of an object within an image imaged by said camera, and
   said operation data further includes the calculated position information.

5. An operating device according to claim 4, further comprising a first button toward said camera on a top surface of said housing, wherein
   said operation data further includes operation information of said first button.

6. An operating device according to claim 5, further comprising a second button provided at a position being opposed to said first button on a bottom surface of said housing, wherein
   said operation data further includes operation information of said second button.

7. An information processing system comprising an information processing apparatus and the operating device according to claim 1, wherein said information processing apparatus configured to:
   receive operation data from said operating device,
   calculate an attitude of said operating device on the basis of the acceleration data and/or the angular velocity data included in the received operation data, and
   perform predetermined information processing in correspondence with the calculated attitude.

8. An information processing system including an operating device and an information processing apparatus according to claim 1, wherein
   said information processing apparatus configured to:
   receive operation data from said operating device,
   detect vibrations of said operating device on the basis of the acceleration data and/or the angular velocity data included in the received operation data, and
   perform the predetermined information processing in correspondence with the detected vibration.

9. An information processing system according to claim 8, wherein
   said information processing apparatus further configured calculate an attitude of said operating device on the basis of the acceleration data and/or the angular velocity data included in the received operation data, and
   perform predetermined information processing in correspondence with the detected vibrations and the calculated attitude.

10. An elastic member provided at one end or in proximity to the one end of an operating device having a narrow housing, an acceleration sensor and/or a gyro sensor accommodated in or coupled to said housing, an operation data transmitter configured to transmits operation data inclusive of at least acceleration data and/or angular velocity data respectively acquired from said acceleration sensor and/or said gyro sensor,
   said elastic member has a spherical surface or substantially a spherical surface, and is formed with an concave having a shape substantially the same as that of the one end of said housing on said spherical surface or substantially the spherical surface, said elastic member also having a recess configured to insert a portion of said housing of the operating device into and hold said portion of said housing of the operating device, and
   said elastic member has a configured enabling the operating device including the elastic member to stand up by itself on the spherical or the substantially spherical surface of the elastic member.

11. An elastic member provided at one end or in proximity to the one end of an operating device having a narrow housing, an acceleration sensor and/or a gyro sensor accommodated in or coupled to said housing, an operation data transmitter configured to transmit operation data inclusive of at least acceleration data and/or angular velocity data respectively acquired from said acceleration sensor and/or said gyro sensor, said elastic member has a curved surface on a side being opposite to a side attached to said housing, and is configured to bring a center of gravity of said operating device entire including said elastic member between a center of curvature of said curved surface and said curved surface by being attached to said housing, and said elastic member has a configuration enabling the operating device entire including the elastic member to stand up by itself on the curved surface of the elastic member.

12. An operating device according to claim 2, wherein said elastic member is detachably attached to the one end of said housing.

13. The operating device according to claim 2, further comprising:

a camera provided to said housing at an end being opposite to the end attached with said elastic member, and said operating device configures to calculate position information of an object within an image imaged by said camera, and said operation data further includes the calculated position information.

14. An information processing system comprising information processing apparatus and the operating device according to claim 2, wherein said information processing apparatus configured to:

receive operation data from said operation device, calculate an attitude of said operating device on the basis of the acceleration data and/or the angular velocity data included in the received operation data, and perform predetermined information processing in correspondence with the calculated attitude.

15. An information processing system comprising an information processing apparatus and the operating device according to claim 2, wherein said information processing apparatus configured to:

receive operation data from said operating device, detect vibrations of said operating device on the basis of the acceleration data and/or the angular velocity data included in the received operation data, and perform the predetermined information processing in correspondence with the detected vibration.

16. The operation device according to claim 1, wherein said operating device can still be maneuvered and operated by a user when the portion of said housing is inserted into said elastic member.

17. The operating device according to claim 1, wherein said operating device can be held in a hand of a user and be operated while the portion of said housing is inserted into said elastic member.

18. The operating device according to claim 1, wherein the operation data comprises at lest one of acceleration data and/or angular velocity data and is acquired from said acceleration sensor and/or said gyro sensor while the elastic member holds said portion of said housing.

19. The operating device according to claim 1, wherein the operation data comprises at least one of acceleration data and/or angular velocity data acquired from said acceleration sensor and/or said gyro sensor and is transmitted to an information processing apparatus while the elastic member holds said portion of said housing.

20. The operating device according to claim 2, wherein the elastic member has a recess configured to hold at least a portion of the housing, and the elastic member configured to be detached from the housing.

21. The elastic member according to claim 11, wherein the elastic member has a recess configured to hold at least a portion of the housing, and the elastic member configured to be detached from the housing.

\* \* \* \* \*